United States Patent
Harada et al.

(10) Patent No.: US 11,548,437 B2
(45) Date of Patent: Jan. 10, 2023

(54) VEHICLE LIGHTING APPARATUS

(71) Applicant: Murakami Corporation, Shizuoka (JP)

(72) Inventors: Yasukuni Harada, Gunma (JP); Chika Itoi, Gunma (JP); Hitoshi Kurihara, Gunma (JP); Yuji Koyano, Gunma (JP); Hiroaki Ueno, Gunma (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 17/421,006

(22) PCT Filed: Dec. 20, 2019

(86) PCT No.: PCT/JP2019/050021
§ 371 (c)(1),
(2) Date: Jul. 6, 2021

(87) PCT Pub. No.: WO2020/145087
PCT Pub. Date: Jul. 16, 2020

(65) Prior Publication Data
US 2022/0097601 A1 Mar. 31, 2022

(30) Foreign Application Priority Data

Jan. 10, 2019 (JP) .............................. JP2019-002784
Apr. 11, 2019 (JP) .............................. JP2019-075609

(51) Int. Cl.
*B60Q 3/51* (2017.01)
*B60Q 3/74* (2017.01)
(Continued)

(52) U.S. Cl.
CPC ................. *B60Q 3/51* (2017.02); *B60Q 3/74* (2017.02); *B60Q 9/004* (2013.01); *B60Q 9/005* (2013.01);
(Continued)

(58) Field of Classification Search
CPC .......... B60Q 3/51; B60Q 9/004; B60Q 9/005; B60Q 9/006; B60R 2011/0028; B60R 7/04; B60R 11/04
See application file for complete search history.

(56) References Cited

U.S. PATENT DOCUMENTS

2004/0114039 A1\* 6/2004 Ishikura ................... B60R 1/00
348/148
2018/0216796 A1 8/2018 Suzuki et al.

FOREIGN PATENT DOCUMENTS

| JP | S6081117 | 6/1985 |
| JP | 2006297981 | 11/2006 |

(Continued)

OTHER PUBLICATIONS

Machine Translation of JP2006297981A retrieved from ESPACENET. (Year: 2022).\*

(Continued)

*Primary Examiner* — Colin J Cattanach
(74) *Attorney, Agent, or Firm* — JCIPRNET

(57) ABSTRACT

A vehicle lighting apparatus includes a first housing, a second housing, two lamp bodies, and two external cameras. The first housing and the second housing are formed separately from each other, joined to be adjacent in the front-rear direction, and arranged to cover a portion of the upper portion of a vehicle interior. The first housing includes a box portion. The second housing includes a wall portion closing a second opening portion of the box portion. An upper first end portion and a lower second end portion at the peripheral edge of the second opening portion of the box portion are joined to an upper third end portion and a lower fourth end portion of the wall portion. The first end portion and the third end portion are arranged relatively closer to the first housing side than the second end portion and the fourth end portion in the front-rear direction.

16 Claims, 21 Drawing Sheets

(51) Int. Cl.
  *B60R 11/04* (2006.01)
  *B60Q 9/00* (2006.01)
  *B60R 11/00* (2006.01)

(52) U.S. Cl.
  CPC ............... *B60Q 9/006* (2013.01); *B60R 11/04* (2013.01); *B60R 2011/0028* (2013.01)

(56) References Cited

FOREIGN PATENT DOCUMENTS

| | | |
|---|---|---|
| JP | 2017056856 | 3/2017 |
| JP | 2018002118 | 1/2018 |
| RU | 2482984 | 5/2013 |

OTHER PUBLICATIONS

Office Action of Russia Counterpart Application, with English translation thereof, dated Dec. 3, 2021, pp. 1-14.
"Office Action of Great Britain Counterpart Application", dated May 30, 2022, p. 1-p. 4.
"International Preliminary Report On Patentability (Form PCT/IB/373) of PCT/JP2019/050021," dated Jun. 16, 2021, with English translation thereof, pp. 1-11.
"International Search Report (Form PCT/ISA/210) of PCT/JP2019/050021," dated Feb. 25, 2020, with English translation thereof, pp. 1-4.

* cited by examiner

VEHICLE LIGHTING APPARATUS

CROSS-REFERENCE TO RELATED APPLICATION

This application is a 371 application of the International PCT application serial no. PCT/JP2019/050021, filed on Dec. 20, 2019, which claims the priority benefits of Japan Patent Application No. 2019-002784, filed on Jan. 10, 2019 and Japan Patent Application No. 2019-075609, filed on Apr. 11, 2019. The entirety of each of the above-mentioned patent applications is hereby incorporated by reference herein and made a part of this specification.

BACKGROUND

Technical Field

The present invention relates to a vehicle lighting apparatus.

The present application claims priority based upon Japanese Patent Application No. 2019-002784, filed in Japan on Jan. 10, 2019 and Japanese Patent Application No. 2019-075609, filed in Japan on Apr. 11, 2019, the contents of which are incorporated herein by reference.

Related Art

Conventionally, a vehicle lighting apparatus has been known which includes a lamp body for vehicle interior lighting and a camera for detecting an object or the like in an overhead console which is arranged at the center of the ceiling (roof lining) of the front seat of a vehicle (for example, see Patent literature 1). The vehicle lighting apparatus includes a housing in which a lamp body accommodating portion for accommodating the lamp body and a camera accommodating portion for accommodating the camera are integrally formed.

LITERATURE OF RELATED ART

Patent Literature

Patent literature 1: Japanese Patent Laid-Open No. 2018-2118

SUMMARY

Problems to be Solved

Because the housing of the vehicle lighting apparatus as described above includes the integrally formed lamp body accommodating portion and the camera accommodating portion, the size of the housing may be large. In addition, the shape of the housing may be complicated due to the integration of the lamp body accommodating portion and the camera accommodating portion, and it may be difficult to manufacture the housing by molding processing using a resin material or the like. Additionally, there arises a problem that it is difficult to individually set material, processing method, weight, rigidity, design, color, and the like in each of the integrated lamp body accommodating portion and the camera accommodating portion.

An object of the present invention is to provide a vehicle lighting apparatus that can improve diversification of specifications and ease of manufacturing.

Means to Solve Problems

In order to solve the above problems, according to a first aspect of the present invention, a vehicle lighting apparatus includes: a first housing and a second housing that are formed separately from each other, joined in a state of being adjacent in a predetermined arrangement direction, and arranged on the upper portion of a vehicle interior of a vehicle; a first accommodating portion and a box portion arranged inside the first housing; a lamp body accommodated in the first accommodating portion; a lid portion that openably closes an opening portion which is arranged in the first housing so as to communicate with the inside of the box portion from the vehicle interior side; and a second accommodating portion which is arranged inside the second housing and in which a detection portion that detects at least one of the outside and the inside of the vehicle is accommodated.

According to a second aspect of the present invention, in the vehicle lighting apparatus according to the first aspect of the present invention, it is preferable that, the second housing includes a wall portion that closes a second opening portion arranged in the box portion, and at the edge of the second opening portion in the box portion, when both ends of the vehicle in a vertical direction are designated as an upper first end portion and a lower second end portion, and both ends of the wall portion of the second housing in the vertical direction are designated as an upper third end portion and a lower fourth end portion, the first end portion and the third end portion are joined to each other, the second end portion and the fourth end portion are joined to each other, and the first end portion and the third end portion are arranged relatively closer to the first housing side than the second end portion and the fourth end portion in the arrangement direction.

According to a third aspect of the present invention, in the vehicle lighting apparatus according to the second aspect of the present invention, it is preferable that, the second end portion and the fourth end portion are joined by a combination of a plurality of claw portions and a plurality of claw fixing portions to which the plurality of claw portions are fixed, and the plurality of claw fixing portions include a first claw fixing portion to which the claw portion is abutted in the vertical direction, and a second claw fixing portion to which the claw portion is abutted in a crossing direction crossing each of the vertical direction and the arrangement direction.

According to a fourth aspect of the present invention, in the vehicle lighting apparatus according to the third aspect of the present invention, it is preferable that, the first claw fixing portion is arranged on the central side in the crossing direction at either the second end portion or the fourth end portion, and the second claw fixing portion is arranged relatively closer to the end portion side than the first claw fixing portion in the crossing direction at either the second end portion or the fourth end portion.

According to a fifth aspect of the present invention, in the vehicle lighting apparatus according to the third or fourth aspect of the present invention, it is preferable that, the second end portion includes the plurality of claw portions extending from the lower side toward the upper side in the vertical direction, and the fourth end portion includes the plurality of claw fixing portions arranged in a plurality of insertion holes into which the plurality of claw portions are inserted from the lower side toward the upper side in the vertical direction.

According to a sixth aspect of the present invention, in the vehicle lighting apparatus according to any one of the third to fifth aspects of the present invention, it is preferable to include a first screw mounting portion arranged in the first housing, a second screw mounting portion arranged in the second housing so as to communicate with the first screw mounting portion, and a screw member that fixes the first housing and the second housing by being mounted on the first screw mounting portion and the second screw mounting portion.

According to a seventh aspect of the present invention, in the vehicle lighting apparatus according to any one of the first to sixth aspects of the present invention, it is preferable that the first housing is made of polypropylene resin or acrylonitrile-butadiene-styrene resin, and the second housing is made of polycarbonate resin.

According to an eighth aspect of the present invention, the vehicle lighting apparatus includes: a first housing and a second housing that are formed separately from each other, joined in a state of being adjacent in a predetermined arrangement direction, and arranged on the upper portion of a vehicle interior of a vehicle; a first accommodating portion and a box portion arranged inside the first housing; a lamp body accommodated in the first accommodating portion; a lid portion that openably closes an opening portion which is arranged in the first housing so as to communicate with the inside of the box portion from the vehicle interior side; and a wall portion arranged in the second housing so as to block a second opening portion arranged in the box portion. At the edge of the second opening portion in the box portion, when both ends of the vehicle in a vertical direction are designated as an upper first end portion and a lower second end portion, and both ends of the wall portion of the second housing in the vertical direction are designated as an upper third end portion and a lower fourth end portion, the first end portion and the third end portion are joined to each other, the second end portion and the fourth end portion are joined to each other, and the second end portion is arranged relatively closer to the lower side than the fourth end portion in the vertical direction.

According to a ninth aspect of the present invention, in the vehicle lighting apparatus according to the eighth aspect of the present invention, it is preferable that the first housing is made of polypropylene resin or acrylonitrile-butadiene-styrene resin, and the second housing is made of a synthetic resin of polycarbonate resin and acrylonitrile-butadiene-styrene resin or acrylonitrile-butadiene-styrene resin.

According to a tenth aspect of the present invention, in the vehicle lighting apparatus according to the first aspect of the present invention, the second housing includes: a cover body that covers a surface of a control device that controls a detection device arranged in the vehicle interior of the vehicle to detect an object outside the vehicle, wherein the surface faces the inside of the vehicle interior; and a ventilation portion which is arranged facing the control device in a predetermined direction in the cover body and which has a plurality of through holes penetrating the cover body. The ventilation portion includes: a wall portion protruding toward the control device; and a plurality of hexagonal regions and a plurality of trapezoidal regions partitioned by the wall portion and arranged adjacent to each other via the wall portion.

According to an eleventh aspect of the present invention, in the vehicle lighting apparatus according to the tenth aspect of the present invention, it is preferable that the wall portion includes: an inner wall portion that is arranged between each of the plurality of hexagonal regions, between each of the plurality of trapezoidal regions, and between the plurality of hexagonal regions and the plurality of trapezoidal regions; and an outer wall portion having a hexagonal outer shape, which is arranged integrally with the inner wall portion and is arranged on the periphery of the ventilation portion.

According to a twelfth aspect of the present invention, in the vehicle lighting apparatus according to the eleventh aspect of the present invention, it is preferable that the protrusion height of the outer wall portion is higher than the protrusion height of the inner wall portion.

According to a thirteenth aspect of the present invention, in the vehicle lighting apparatus according to the twelfth aspect of the present invention, it is preferable that, among the plurality of hexagonal regions, the hexagonal region arranged adjacent to the outer wall portion is defined as an outer wall side hexagonal region, and two trapezoidal regions, which are partitioned by the inner wall portion arranged parallel to one of the outer wall portions adjacent to the outer wall side hexagonal region, are arranged inside the outer wall side hexagonal region.

According to a fourteenth aspect of the present invention, in the vehicle lighting apparatus according to the thirteenth aspect of the present invention, it is preferable that, the number of the plurality of hexagonal regions is eight, and the plurality of hexagonal regions arranged in a honeycomb structure include: two central side hexagonal regions adjacent to a predetermined arrangement direction at the center of the ventilation portion; two different row hexagonal regions adjacent to each of the two central side hexagonal regions from both sides in a direction orthogonal to the predetermined arrangement direction; and four outer wall side hexagonal regions adjacent to any one of the two central side hexagonal regions and any one of the two different row hexagonal regions, the number of the plurality of trapezoidal regions is 14, and the 14 trapezoidal regions includes: two first outer wall side trapezoidal regions adjacent to each of the two central side hexagonal regions from both sides in the predetermined arrangement direction; eight hexagonal inner trapezoidal regions arranged two by two inside each of the four outer wall side hexagonal regions; and four second outer wall side trapezoidal regions adjacent to each of the two different row hexagonal regions from both sides in a direction orthogonal to the predetermined arrangement direction.

According to a fifteenth aspect of the present invention, in the vehicle lighting apparatus according to the fourteenth aspect of the present invention, it is preferable that the cover body includes a gate mark arranged outside the ventilation portion, and one of the two first outer wall side trapezoidal regions that has a longer distance from the gate mark than the other is a non-through holes forming region in which the through holes are not formed.

According to a sixteenth aspect of the present invention, in the vehicle lighting apparatus according to the fourteenth aspect or the fifteenth aspect of the present invention, it is preferable that, nineteen through holes are formed in each of the two central side hexagonal regions and the two different row hexagonal regions, each of the two central side hexagonal regions and the two different row hexagonal regions has a first hole row, a second hole row, a third hole row, a fourth hole row, and a fifth hole row arranged sequentially between arbitrary opposite sides of the hexagonal region in a direction orthogonal to the opposite sides, in each of the first hole row and the fifth hole row, three through holes are arranged parallel to the opposite sides, in each of the second hole row and the fourth hole row, four through holes are arranged parallel to the opposite sides, in the third hole row, five through holes are arranged parallel to the opposite sides, seven through holes are formed in one of the two first outer wall side trapezoidal regions, and in each of the four second outer wall side trapezoidal regions and the eight hexagonal inner trapezoidal regions, a sixth hole row and a seventh hole row that are arranged side by side between the bases of the trapezoidal region in a direction orthogonal to the base are arranged in one of the two first outer wall side trapezoidal regions and in each of the four second outer wall side trapezoidal regions and the eight hexagonal inner trapezoidal regions, in the sixth hole row, three through holes are arranged parallel to the base, and in the seventh hole row, four through holes are arranged parallel to the base.

According to a seventeenth aspect of the present invention, in the vehicle lighting apparatus according to any one of the tenth to sixteenth aspects of the present invention, it is preferable to include, on the surface of the cover body on the vehicle interior side, a design portion in which a plurality of recesses having the same diameter as the through holes are formed.

Effect

According to the present invention, the first housing and the second housing formed separately from each other can improve diversification of specifications and ease of manufacturing.

DESCRIPTION OF THE EMBODIMENTS

Hereinafter, a first embodiment of the present invention is described with reference to the accompanying drawings.

First Embodiment (Vehicle Lighting Apparatus)

Figure 1:
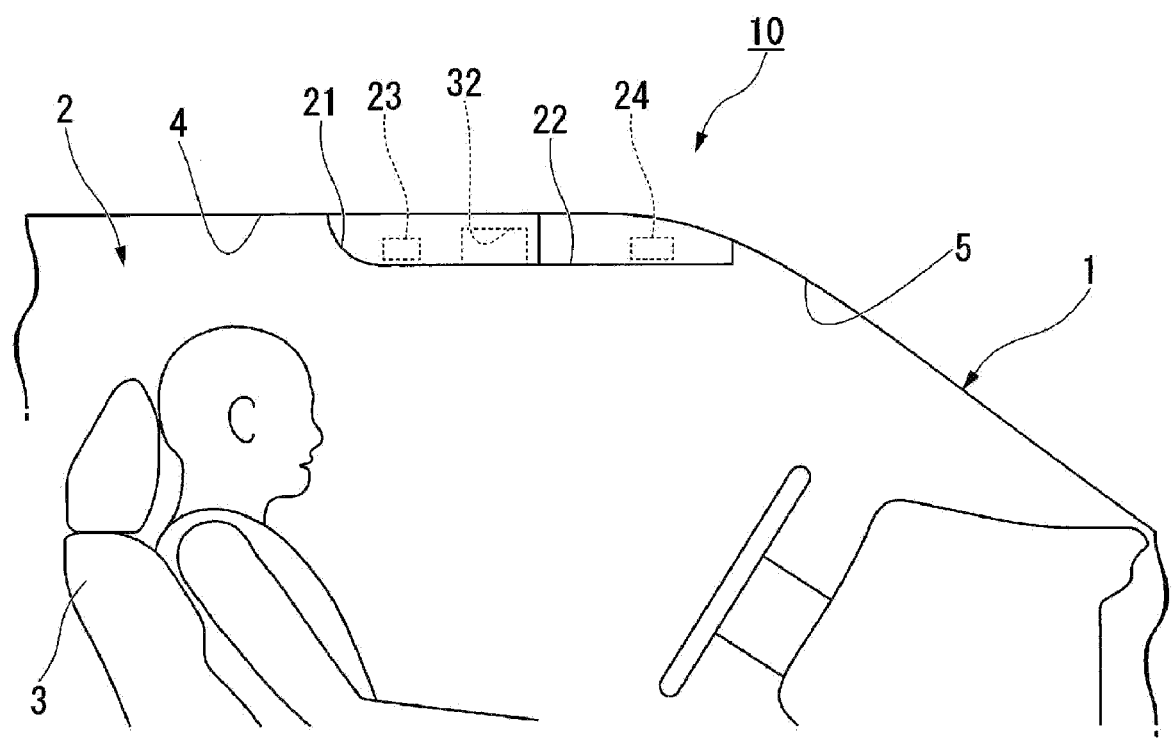
FIG. 1 is a side view of a vehicle when viewed from a left-right direction, showing the configuration of a vehicle lighting apparatus according to a first embodiment of the present invention.
Figure 1:
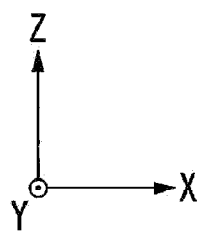
Figure 2:
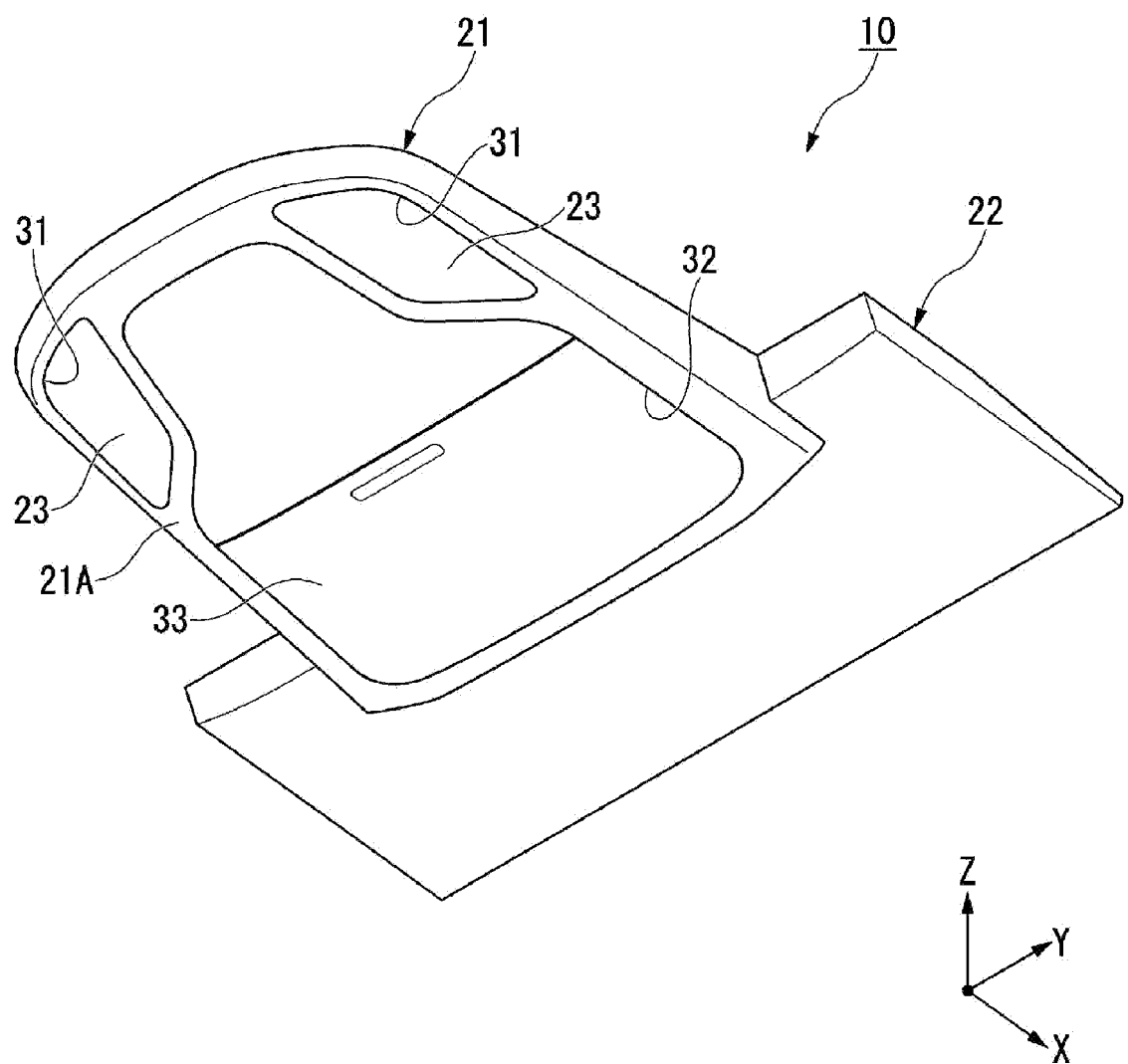
FIG. 2 is a perspective view showing the configuration of the vehicle lighting apparatus according to the first embodiment of the present invention.

FIG. 1 is a side view of a vehicle 1 when viewed from a left-right direction, showing the configuration of a vehicle lighting apparatus 10 according to a first embodiment. FIG. 2 is a perspective view showing the configuration of the vehicle lighting apparatus 10 according to the embodiment.

As shown in FIG. 1, the vehicle lighting apparatus 10 of the first embodiment is arranged on the upper portion of a front seat 3 in a vehicle interior 2 of the vehicle 1. The upper portion of the vehicle interior 2 refers to, for example, a roof lining 4 corresponding to a ceiling, the upper portion of a front window 5, and the like.

In the following, the axial directions of X-axis, Y-axis, and Z-axis that are orthogonal to each other in a three-dimensional space are parallel to each axis. For example, the front-rear direction of the vehicle 1 is parallel to the X-axis direction. The positive direction in the X-axis direction is the direction from the rear to the front of the vehicle 1. The left-right direction of the vehicle 1 is parallel to the Y-axis direction. The positive direction in the Y-axis direction is the direction from the right side to the left side of the vehicle 1. The vertical direction of the vehicle 1 is parallel to the Z-axis direction. The positive direction in the Z-axis direction is the direction from the lower portion to the upper portion of the vehicle 1.

As shown in FIG. 1 and FIG. 2, the vehicle lighting apparatus 10 includes a first housing 21, a second housing 22, two lamp bodies 23, and two external cameras 24. The external camera 24 corresponds to a detection portion in the claims.

The first housing 21 and the second housing 22 are formed separately from each other. The first housing 21 and the second housing 22 are joined in a state of being adjacent in the front-rear direction (X-axis direction), and are arranged so as to cover a portion of the upper portion of the vehicle interior 2. The front-rear direction corresponds to an arrangement direction in the claims.

Figure 3:
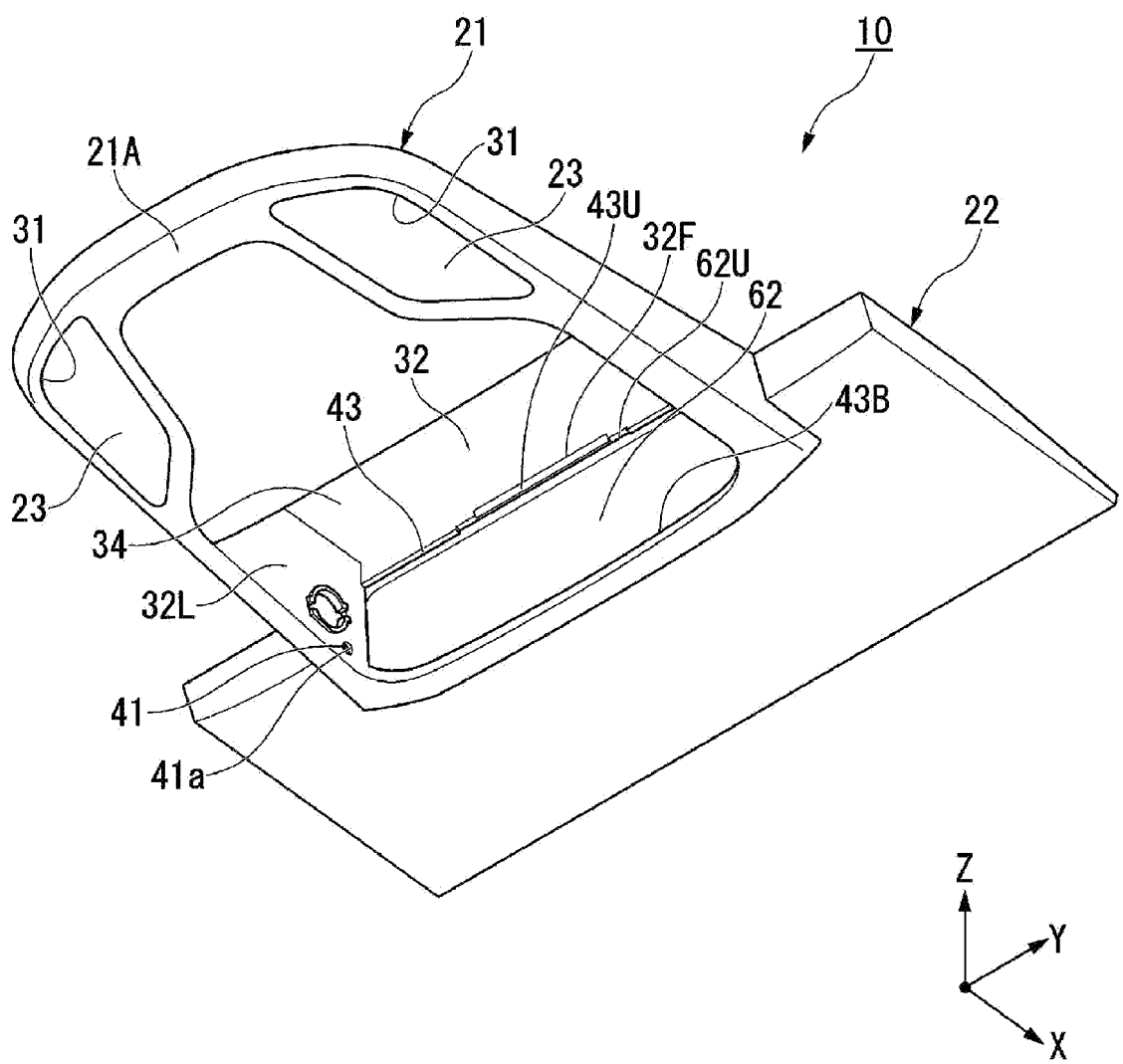
FIG. 3 is a perspective view of a box portion of a first housing of the vehicle lighting apparatus according to the first embodiment of the present invention when viewed from a vehicle interior side.
Figure 4:
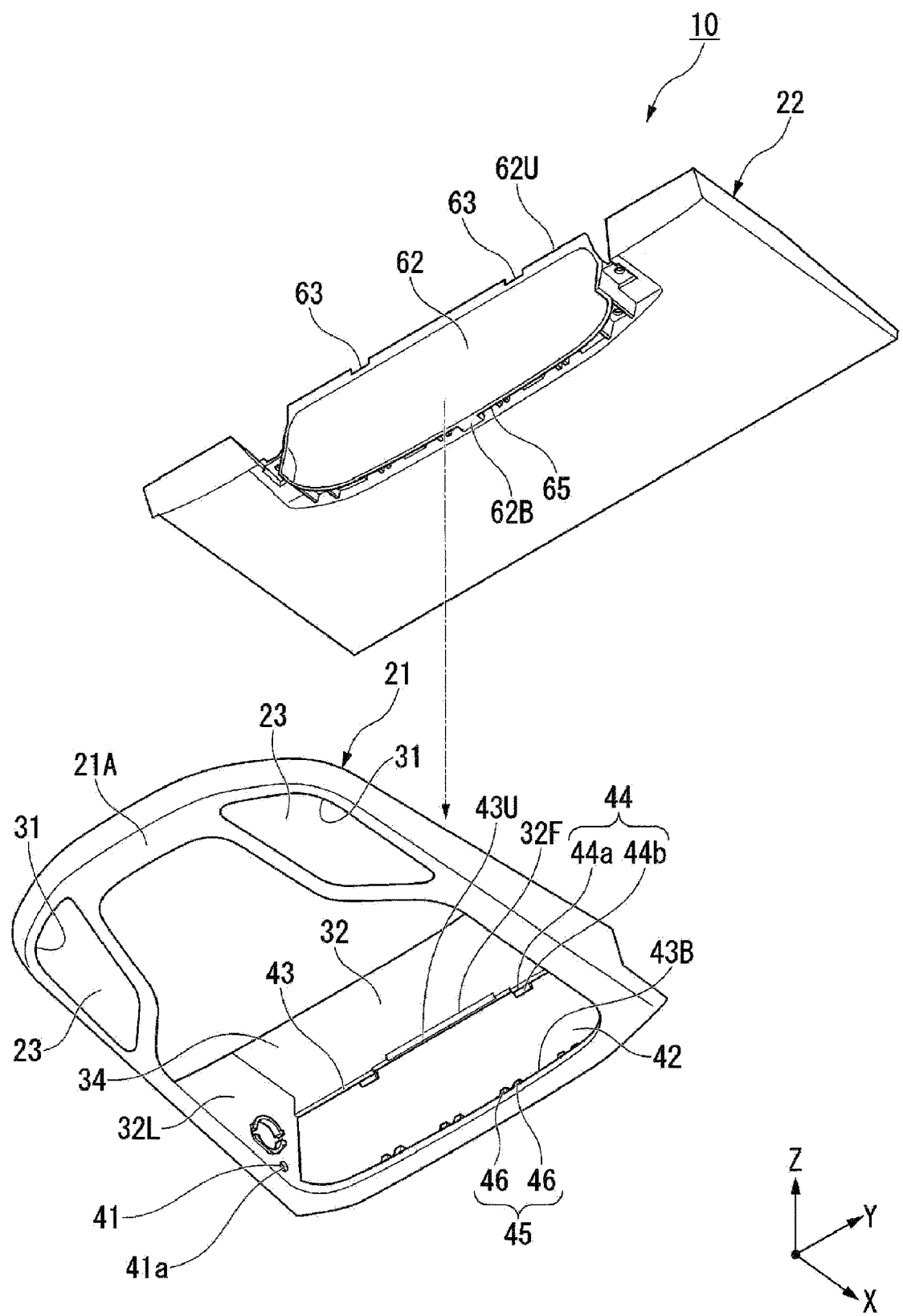
FIG. 4 are perspective views in which the first housing and a second housing of the vehicle lighting apparatus shown in FIG. 3 are shown in an exploded manner.
Figure 5:
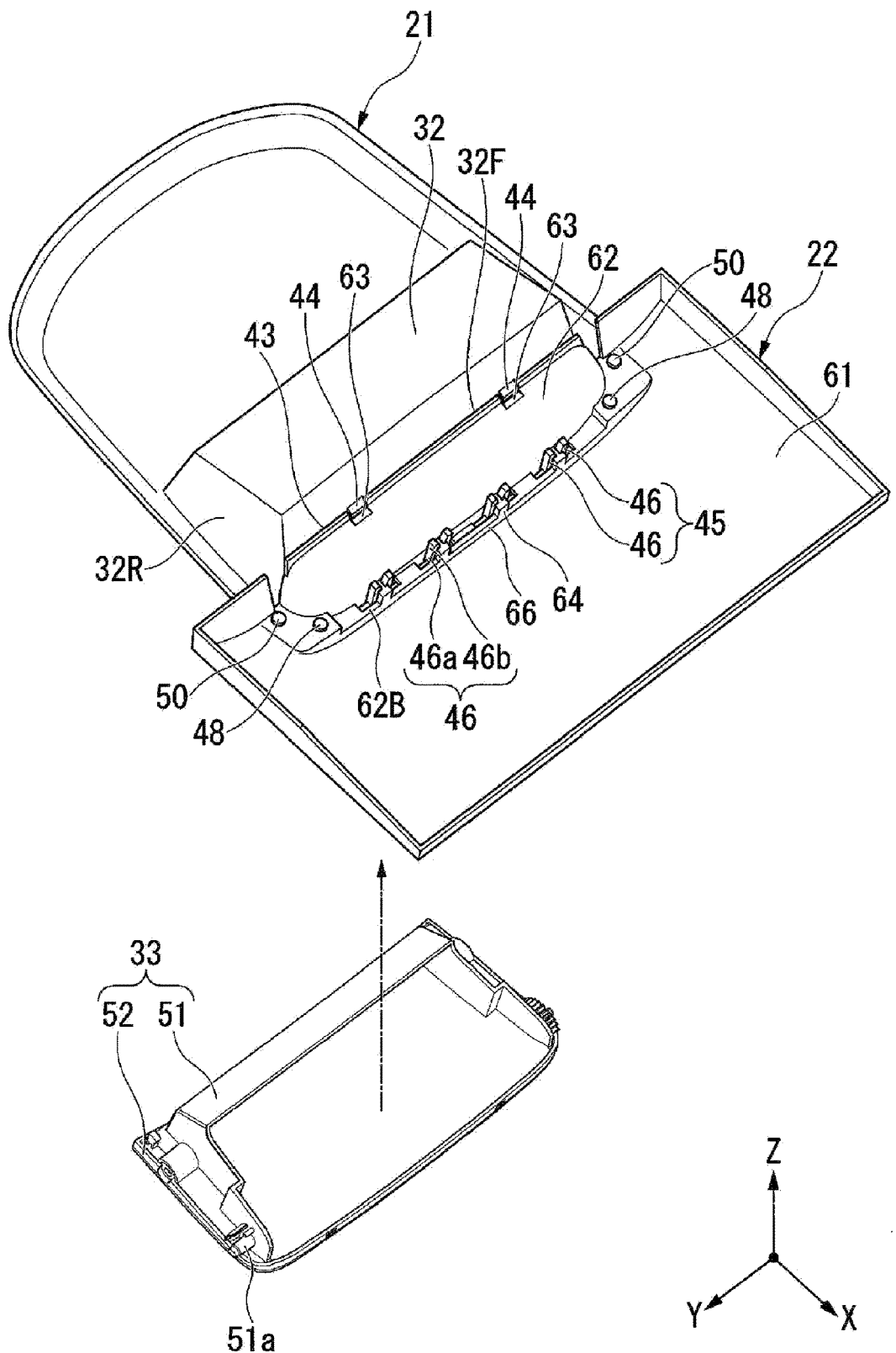
FIG. 5 are perspective views in which the first housing and the second housing, and a lid member of the vehicle lighting apparatus according to the first embodiment of the present invention are shown in an exploded manner when viewed from a back surface side.
Figure 6:
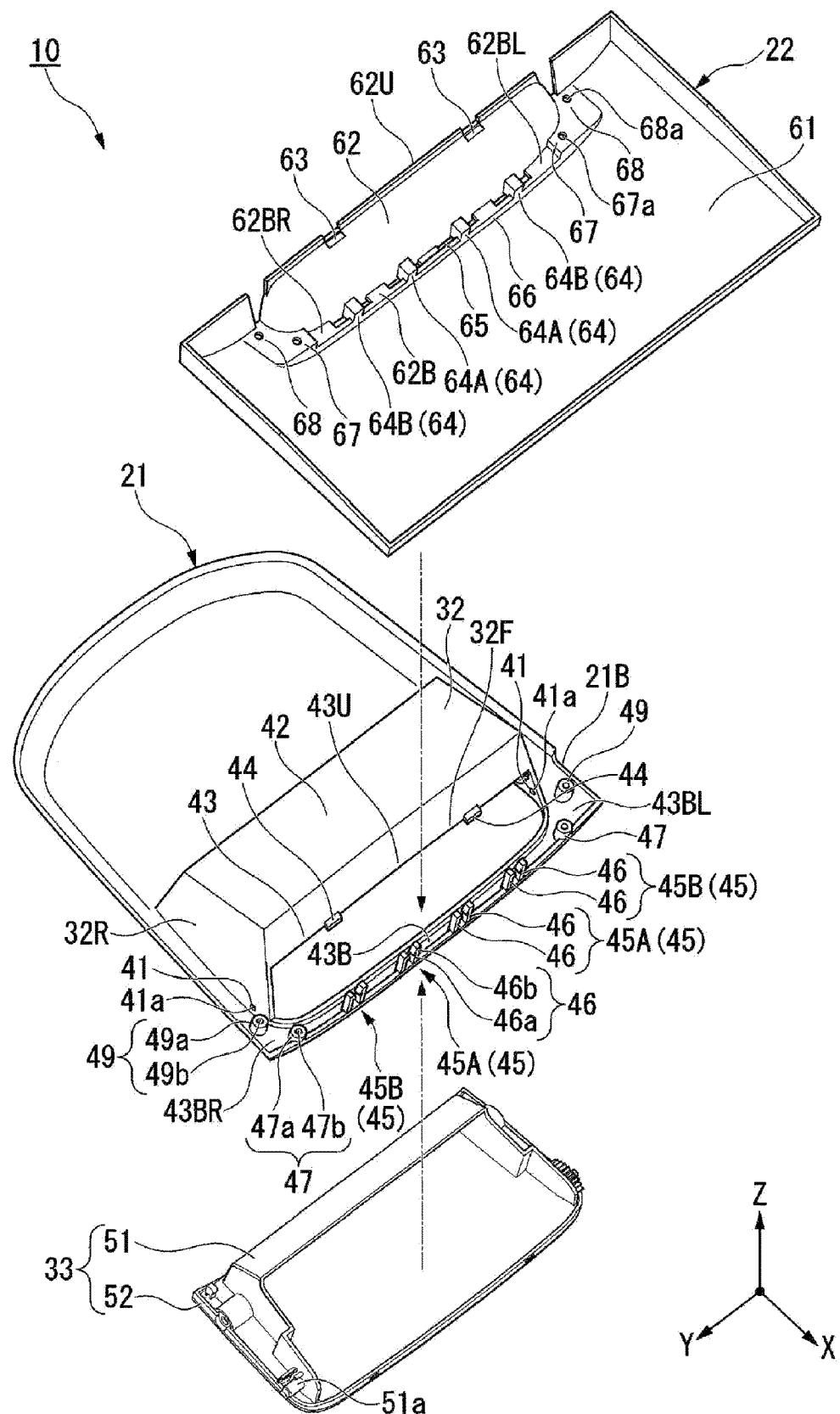
FIG. 6 are perspective views in which the first housing and the second housing of the vehicle lighting apparatus shown in FIG. 5 are shown in an exploded manner.
Figure 7:
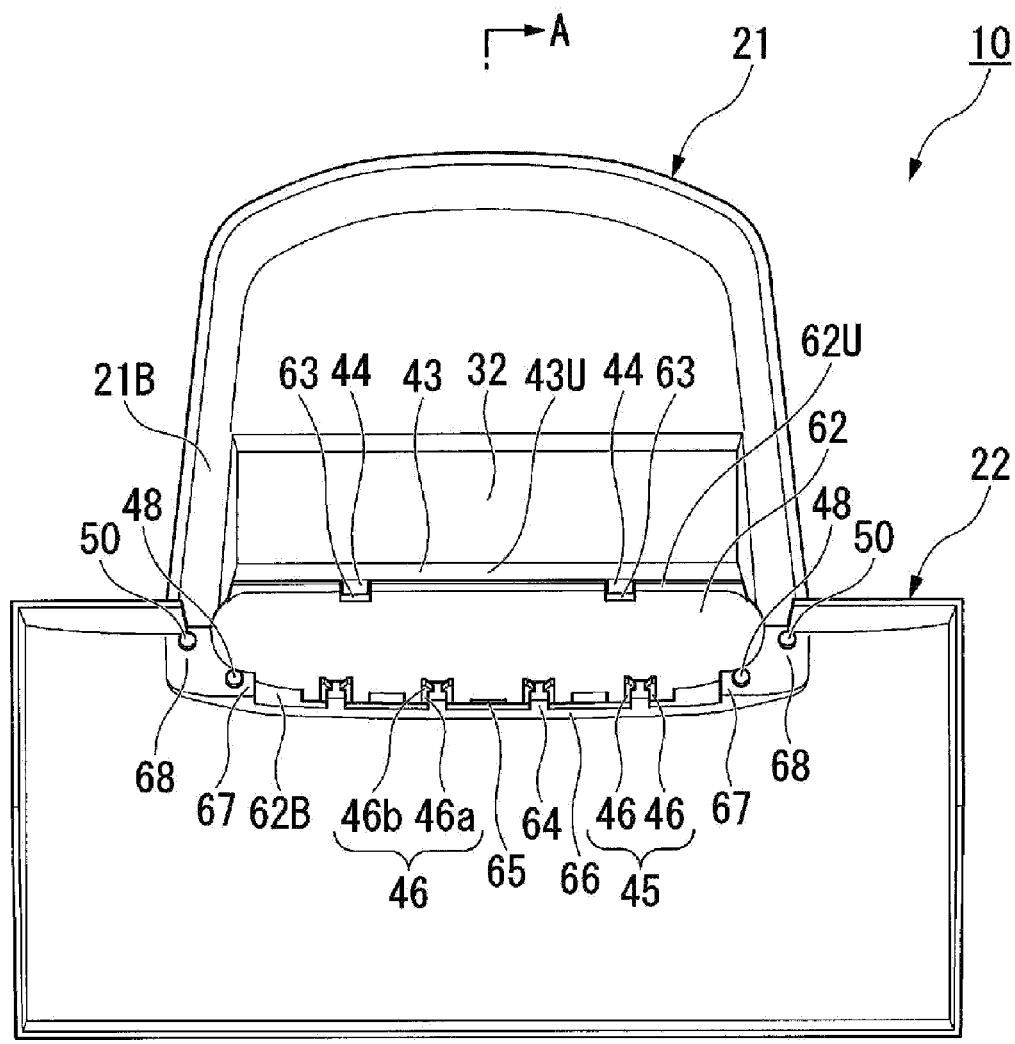
FIG. 7 is a perspective view of the first housing and the second housing of the vehicle lighting apparatus according to the first embodiment of the present invention when viewed from an inner surface side.
Figure 8:
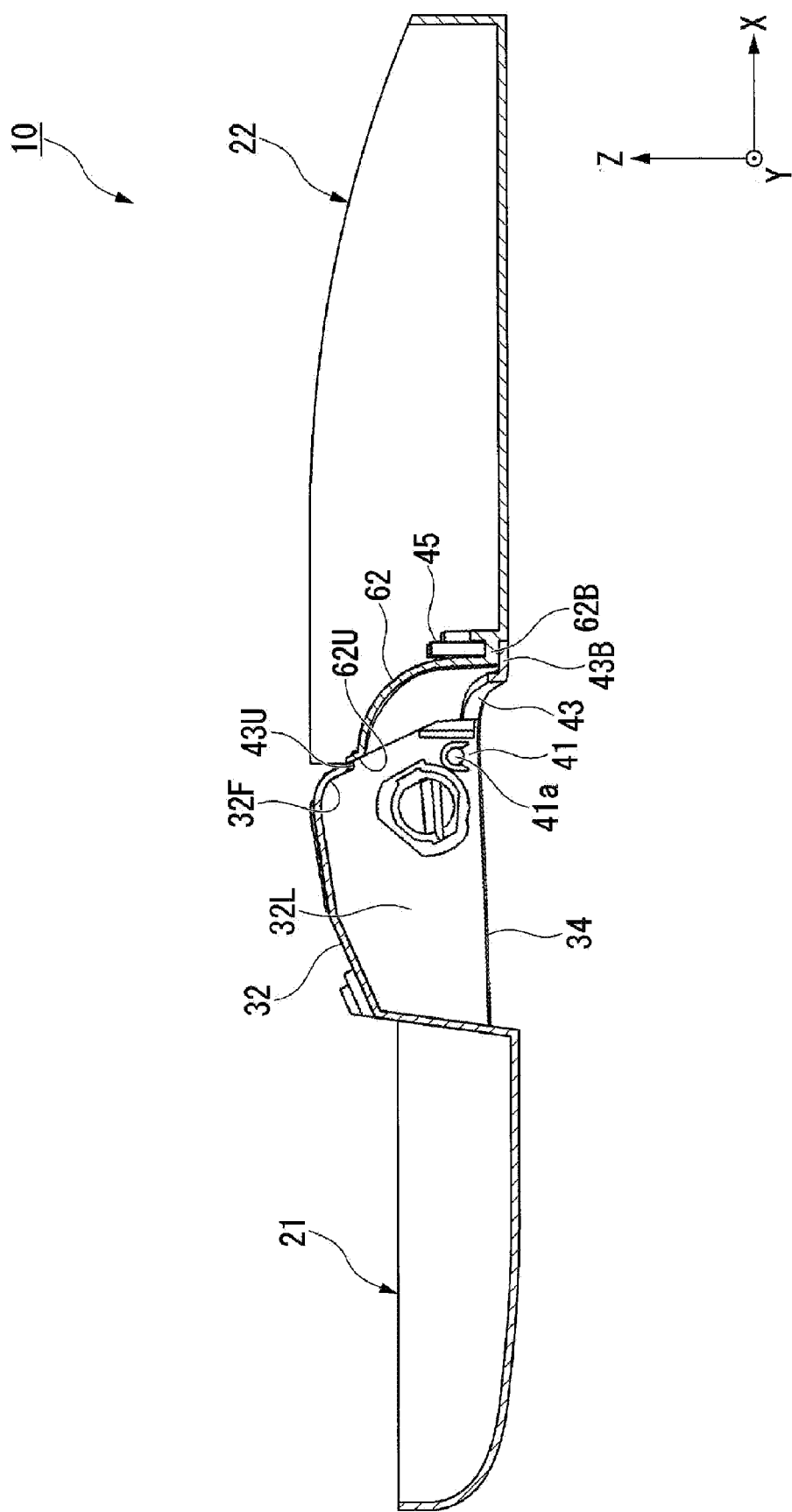
FIG. 8 is a cross-sectional view of an X-Z plane taken along line A-A shown in FIG. 7.

FIG. 3 is a perspective view of a box portion 32 of the first housing 21 of the vehicle lighting apparatus 10 according to the first embodiment when viewed from the vehicle interior 2 side. FIG. 4 are perspective views in which the first housing 21 and the second housing 22 of the vehicle lighting apparatus 10 shown in FIG. 3 are shown in an exploded manner. FIG. 5 are perspective views in which the first housing 21 and the second housing 22, and a lid member 33 of the vehicle lighting apparatus 10 according to the first embodiment are shown in an exploded manner when viewed from a back surface 21B side. FIG. 6 are perspective views in which the first housing 21 and the second housing 22 of the vehicle lighting apparatus shown in FIG. 5 are shown in an exploded manner. FIG. 7 is a perspective view of the first housing 21 and the second housing 22 of the vehicle lighting apparatus according to the first embodiment when viewed from inner surface side. FIG. 8 is a cross-sectional view of an X-Z plane taken along line A-A shown in FIG. 7.

As shown in FIGS. 1 to 8, the outer shape of the first housing 21 is formed in, for example, a box shape provided with a plurality of opening portions. The first housing 21 is made of a highly flexible resin material such as polypropylene resin or acrylonitrile-butadiene-styrene resin. The first housing 21 is arranged so as to cover a portion of the roof lining 4.

The first housing 21 includes two lamp body accommodating portions 31, the box portion 32, and the lid member 33. The lamp body accommodating portion 31 corresponds to a first accommodating portion in the claims. The lid member 33 corresponds to a lid portion in the claims.

The outer shape of each of the two lamp body accommodating portions 31 is formed in, for example, a concave shape that is recessed upward in the vertical direction (toward the positive direction in the Z-axis direction) on a surface 21A exposed on the vehicle interior 2 side of the first housing 21. The two lamp body accommodating portions 31 are arranged on the rear side in the front-rear direction (negative direction in the X-axis direction) of the first housing 21. Each of the two lamp body accommodating portions 31 accommodates the lamp body 23.

The outer shape of the box portion 32 is formed in, for example, a concave shape that is recessed upward in the vertical direction on the surface 21A of the first housing 21. Accordingly, a first opening portion 34 is formed in the first housing 21 so as to communicate with the inside of the box portion 32 from the vehicle interior 2 side. The first opening portion 34 corresponds to an opening portion in the claims.

The box portion 32 constitutes a console box of a so-called overhead console, and is arranged on the front side of the first housing 21 in the front-rear direction (positive direction side in the X-axis direction). The box portion 32 accommodates the lid member 33, which openably closes the first opening portion 34, so that the lid member 33 can be pulled out to the vehicle interior 2 side.

The box portion 32 includes, at each front part in the front-rear direction of a left side end portion 32L and a right side end portion 32R in the left-right direction (Y-axis direction), a shaft support portion 41 that supports a rotary shaft 51a of the lid member 33 (described later) to be rotatable. For example, a shaft insertion hole 41a into which the rotary shaft 51a of the lid member 33 is inserted in a rotatable manner is formed in the shaft support portion 41.

A second opening portion 42 is formed at a front side end portion 32F of the box portion 32 in the front-rear direction. The second opening portion 42 corresponds to a second opening portion in the claims. The box portion 32 includes a plurality of (for example, two) first claw portions 44 at a first end portion 43U on the upper side in the vertical direction of a peripheral edge 43 forming the second opening portion 42. The peripheral edge 43 corresponds to an edge in the claims. For example, the two first claw portions 44 protrude forward in the front-rear direction at predetermined intervals in the left-right direction. Each first claw portion 44 includes, for example, as shown in FIG. 4, a leg portion 44a extending in the front-rear direction and a head portion 44b protruding downward in the vertical direction from the front end portion of the leg portion 44a.

As shown in FIGS. 4 to 7, each first claw portion 44 is mechanically joined to a first claw holding portion 63 of the second housing 22 described later by a so-called cantilever type snap fit. Each of the first claw portions 44 engages the head portion 44b with the first claw holding portion 63 from the upper side to the lower side in the vertical direction by the elasticity of the leg portion 44a. Accordingly, the first housing 21 and the second housing 22 are fixed to each other.

The box portion 32 includes a plurality of (for example, four) second claw portions 45 at a lower second end portion 43B of the peripheral edge 43 of the second opening portion 42 in the vertical direction. The second claw portion 45 corresponds to a claw portion in the claims. For example, the four second claw portions 45 are arranged at predetermined intervals in the left-right direction. Each second claw portion 45 includes a pair of claw pieces 46 that are separated from each other in the left-right direction and protrude upward in the vertical direction. Each claw piece 46 includes, for example, as shown in FIG. 6, a leg portion 46a extending in the vertical direction and a head portion 46b protruding from the front end portion of the leg portion 46a in the left-right direction. The pair of claw pieces 46 are arranged in a manner that the head portions 46b of each other protrude in the opposite directions in the left-right direction.

The pair of claw pieces 46 of each second claw portion 45 are mechanically joined to a second claw holding portion 64 (for example, a central side second claw holding portion 64A or an end portion side second claw holding portion 64B) of the second housing 22, which is described later, by the so-called cantilever type snap fit. The pair of claw pieces 46 are arranged so as to sandwich the second claw holding portion 64 from both sides in the left-right direction, and abuts each head portion 46b or each leg portion 46a against the second claw holding portion 64 by the elasticity of the leg portion 46a. Accordingly, the first housing 21 and the second housing 22 are fixed to each other.

Each claw piece 46 of two central side second claw portions 45A of the four second claw portions 45 that are arranged at the central side of the second end portion 43B in the left-right direction abuts the head portion 46b against the second claw holding portion 64 (the central side second claw holding portion 64A) from the upper side to the lower side in the vertical direction by the elasticity of the leg portion 46a. Accordingly, the positions of the first housing 21 and the second housing 22 in the vertical direction are regulated.

Each claw piece 46 of two end portion side second claw portions 45B of the four second claw portions 45 that are arranged at both end sides (a left end 43BL side and a right end 43BR side) of the second end portion 43B in the left-right direction abuts the leg portion 46a against the second claw holding portion 64 (the end portion side second claw holding portion 64B) from the left-right direction by the elasticity of the leg portion 46a. Accordingly, the positions of the first housing 21 and the second housing 22 in the left-right direction are regulated.

The box portion 32 includes two first screw mounting portions 47 that are arranged closer to both end sides (the left end 43BL side and the right end 43BR side) than the four second claw portions 45 at the second end portion 43B of the peripheral edge 43 of the second opening portion 42 in the left-right direction. Each first screw mounting portion 47 includes, for example, a first boss 47a protruding upward in the vertical direction. The first boss 47a is formed with first screw holes 47b that are aligned facing first screw insertion holes 67a of the second housing 22, which are described later. The vehicle lighting apparatus 10 includes a first screw member 48 that is inserted into the first screw insertion hole 67a and screwed into the first screw hole 47b. The first screw member 48 fixes the first housing 21 and the second housing 22 to each other, and regulates the positions of the first housing 21 and the second housing 22 in any other direction in addition to the vertical direction and the left-right direction.

The first housing 21 includes two second screw mounting portions 49 that are arranged closer to both end sides (left end side and right end side) than the two first screw mounting portions 47 around the box portion 32 in the left-right direction. Each second screw mounting portion 49 includes, for example, a second boss 49a protruding upward in the vertical direction from the back surface 21B of the first housing 21. The second boss 49a is formed with second screw holes 49b that are aligned facing second screw insertion holes 68a of the second housing 22, which are described later.

The vehicle lighting apparatus 10 includes a second screw member 50 that is inserted into the second screw insertion hole 68a and screwed into the second screw hole 49b. The second screw member 50 fixes the first housing 21 and the second housing 22 to each other, and regulates the positions of the first housing 21 and the second housing 22 in any other direction in addition to the vertical direction and left-right direction. The first screw mounting portion 47 and the second screw mounting portion 49 correspond to a first screw mounting portion in the claims. The first screw member 48 and the second screw member 50 correspond to a screw member in the claims.

The lid member 33 includes a case 51 and a cover 52.

The outer shape of the case 51 is formed in, for example, an open box shape. The case 51 accommodates appropriate objects, such as sunglasses worn by an occupant of the vehicle 1 and other objects. The case 51 includes the rotary shaft 51a extending in the left-right direction at an end portion on the front side in the front-rear direction. The rotary shaft 51a is inserted into the shaft insertion hole 41a of the box portion 32. The case 51 rotates around the axis of the rotary shaft 51a. Accordingly, the case 51 is pulled out from the inside of the box portion 32 to the vehicle interior 2 side, or is accommodated inside the box portion 32 from the vehicle interior 2 side.

The cover 52 is attached to the case 51 so as to cover the lower surface of the case 51 (the surface facing the vehicle interior 2 side at the lower portion in the vertical direction). The cover 52 openably closes the first opening portion 34 of the first housing 21 as the case 51 rotates. The cover 52 closes the first opening portion 34 when the case 51 is accommodated inside the box portion 32, and releases the closing of the first opening portion 34 when the case 51 is pulled out from the inside of the box portion 32 to the vehicle interior 2 side.

As shown in FIGS. 1 to 8, the outer shape of the second housing 22 is formed in, for example, an open box shape. The second housing 22 is made of a highly rigid resin material such as a polycarbonate resin or the like. The second housing 22 is arranged so as to cover a portion of the upper portion of the front window 5.

The second housing 22 includes a camera accommodating portion 61 and a wall portion 62. The camera accommodating portion 61 corresponds to a second accommodating portion in the claims.

The outer shape of the camera accommodating portion 61 is formed in, for example, a box shape that opens upward in the vertical direction and forward in the front-rear direction. The camera accommodating portion 61 is arranged on the front side of the second housing 22 in the front-rear direction. The camera accommodating portion 61 accommodates two external cameras 24 that are arranged apart from each other in the left-right direction.

The outer shape of the wall portion 62 is formed in, for example, a plate shape that is curved along the rotation locus of the front end (end portion on the front side in the front-rear direction) of the lid member 33 in the box portion 32 of the first housing 21. The wall portion 62 is arranged on the rear side of the second housing 22 in the front-rear direction. The wall portion 62 closes the second opening portion 42 of the box portion 32 of the first housing 21.

An upper third end portion 62U of the wall portion 62 in the vertical direction is arranged on the first housing 21 side in the front-rear direction relatively behind a lower fourth end portion 62B of the wall portion 62 in the vertical direction.

As shown in FIGS. 4 to 7, the wall portion 62 includes a plurality of (for example, two) first claw holding portions 63 at the upper third end portion 62U in the vertical direction. For example, the two first claw holding portions 63 are arranged at predetermined intervals in the left-right direction. The outer shape of each first claw holding portion 63 is formed into, for example, a concave shape in which the head portion 44b of each first claw portion 44 of the first housing 21 is engaged (stopped in an engaged state) from the upper side to the lower side in the vertical direction. The first housing 21 and the second housing 22 are fixed to each other by mutual engagement of each first claw portion 44 and each first claw holding portion 63.

The wall portion 62 includes a plurality of (for example, four) second claw holding portions 64 at the lower fourth end portion 62B in the vertical direction. For example, the four second claw holding portions 64 are arranged at predetermined intervals in the left-right direction. The fourth end portion 62B is formed with a plurality of (for example, four) through hole 65 into which a plurality of (for example, four) second claw portions 45 of the first housing 21 are inserted from the vehicle interior 2 side toward the inside of the second housing 22. For example, the four through holes 65 are arranged at predetermined intervals in the left-right direction. Each second claw holding portion 64 is formed so as to extend upward in the vertical direction from an edge 66 of each through hole 65 on the central side of each through hole 65 in the left-right direction. The outer shape of each second claw holding portion 64 is formed into, for example, a columnar shape which extends upward from the edge 66 in the vertical direction and in which each second claw portion 45 is engaged in the vertical direction or the left-right direction. The through hole 65 corresponds to an insertion hole in the claims.

As shown in FIG. 8, the second end portion 43B of the first housing 21 having the plurality of second claw portions 45 is arranged so as to overlap, from the vehicle interior 2 side, that is, the lower side in the vertical direction, the fourth end portion 62B of the second housing 22 in which a plurality of the through holes 65 are formed. Accordingly, as shown in FIGS. 5 to 7, the pair of claw pieces 46 of each second claw portion 45 are inserted into each through hole 65 from the lower side toward the upper side in the vertical direction toward the inside of the second housing 22, so as to sandwich each second claw holding portion 64 from both sides in the left-right direction. The first housing 21 and the second housing 22 are fixed to each other by engaging the pair of claw pieces 46 of each second claw portion 45 with each second claw holding portion 64 in the vertical direction or the left-right direction.

As shown in FIG. 6, the two central side second claw holding portions 64A of the four second claw holding portions 64 that are arranged on the central side of the fourth end portion 62B in the left-right direction abut against the two second claw portions 45 (the central side second claw portions 45A) in the vertical direction. Accordingly, the positions of the first housing 21 and the second housing 22 in the vertical direction are regulated. The two central side second claw holding portions 64A arranged on the central side in the left-right direction correspond to a first claw fixing portion in the claims. The two end portion side second claw holding portions 64B of the four second claw holding portions 64 that are arranged at both end sides (a left end 62BL side and a right end 62BR side) of the fourth end portion 62B in the left-right direction abut against the two second claw portions 45 (the end portion side second claw portions 45B) in the left-right direction. Accordingly, the positions of the first housing 21 and the second housing 22 in the left-right direction are regulated. The two end portion side second claw holding portions 64B arranged on both end sides (the left end 62BL side and the right end 62BR side) in the left-right direction correspond to a second claw fixing portion in the claims. The left-right direction corresponds to a crossing direction in the claims. The left end 62BL side and the right end 62BR side correspond to an end portion side in the claims.

The second housing 22 includes two third screw mounting portions 67 that are arranged closer to both end sides (left end side and right end side) than the four second claw holding portions 64 around the wall portion 62 in the left-right direction. Each of the third screw mounting portions 67 is formed with, for example, the first screw insertion holes 67a that are aligned facing the first screw holes 47b of each first screw mounting portion 47 of the first housing 21. As described above, each first screw member 48 inserted into each first screw insertion hole 67a is screwed into each first screw hole 47b. Accordingly, the first housing 21 and the second housing 22 are fixed.

The second housing 22 includes two fourth screw mounting portions 68 that are arranged closer to both end sides (left end side and right end side) than the two third screw mounting portions 67 around the wall portion 62 in the left-right direction. Each of the fourth screw mounting portions 68 is formed with, for example, the second screw insertion holes 68a that are aligned facing the second screw holes 49b of each second screw mounting portion 49 of the first housing 21. As described above, each second screw member 50 inserted into each second screw insertion hole 68a is screwed into each second screw hole 49b. Accordingly, the first housing 21 and the second housing 22 are fixed. The third screw mounting portion 67 and the fourth screw mounting portion 68 correspond to a second screw mounting portion in the claims.

When joining the first housing 21 and the second housing 22, first, each first claw portion 44 is engaged with each first claw holding portion 63 at the first end portion 43U of the first housing 21 and the third end portion 62U of the second housing 22. Next, each second claw portion 45 is engaged with each second claw holding portion 64 at the second end portion 43B of the first housing 21 and the fourth end portion 62B of the second housing 22.

Then, each first screw mounting portion 47 of the first housing 21 and each third screw mounting portion 67 of the second housing 22 are fixed by the first screw member 48. In addition, each second screw mounting portion 49 of the first housing 21 and each fourth screw mounting portion 68 of the second housing 22 are fixed by the second screw member 50.

Each of the two lamp bodies 23 is, for example, a light emitting diode or the like.

The two external cameras 24 are, for example, stereo cameras or the like that are arranged apart from each other in the left-right direction. The two external cameras 24 detect pedestrians, objects, and the like in front of the vehicle 1 in the front-rear direction. The two external cameras 24 are controlled, for example, by an appropriate control device. The control device is a software function unit that functions by executing a predetermined program by a processor such as a central processing unit (CPU) or the like. The software function unit is an electronic control unit (ECU) equipped with a processor such as a CPU, a read only memory (ROM) for storing programs, a random access memory (RAM) for temporarily storing data, and an electronic circuit such as a timer or the like. At least a portion of the control device may be an integrated circuit such as large sale integration (LSI) or the like.

As described above, according to the vehicle lighting apparatus 10 of the first embodiment, the first housing 21 and the second housing 22 are formed separately. This enables individual settings for the material, processing method, weight, rigidity, design, color, and the like. For example, an increase in the sizes of the first housing 21 and the second housing 22 can be suppressed as compared with a case in which the first housing 21 and the second housing 22 are integrally formed. Accordingly, it is possible to diversify the specifications of the first housing 21 and the second housing 22 and improve the ease of manufacturing. For example, when the first housing 21 and the second housing 22 are manufactured by molding processing, the occurrence of structurally weak parts such as weld lines or the like and poor appearance parts can be suppressed.

The second opening portion 42 is formed in the box portion 32 of the first housing 21, and the wall portion 62 for closing the second opening portion 42 is arranged in the second housing 22, and the upper third end portion 62U of the wall portion 62 is arranged relatively closer to the first housing 21 side than the lower fourth end portion 62B in the front-rear direction. Accordingly, each of the separate first housing 21 and the second housing 22 can be easily manufactured by molding processing. That is, for example, when the box portion 32 of the first housing 21 is not provided with the second opening portion 42, or for example, when the upper third end portion 62U on the wall portion 62 of the second housing 22 is arranged relatively closer to the second housing 22 side than the lower fourth end portion 62B in the front-rear direction, there arises a problem that it becomes difficult to manufacture each of the first housing 21 and the second housing 22 by molding processing. In order to solve the above problem, the second opening portion 42 is arranged in the box portion 32 of the first housing 21, and on the wall portion 62 of the second housing 22 that closes the second opening portion 42, the third end portion 62U is arranged relatively closer to the first housing 21 side than the fourth end portion 62B. Accordingly, the ease of manufacture of the first housing 21 and the second housing 22 can be improved.

Figure 9:
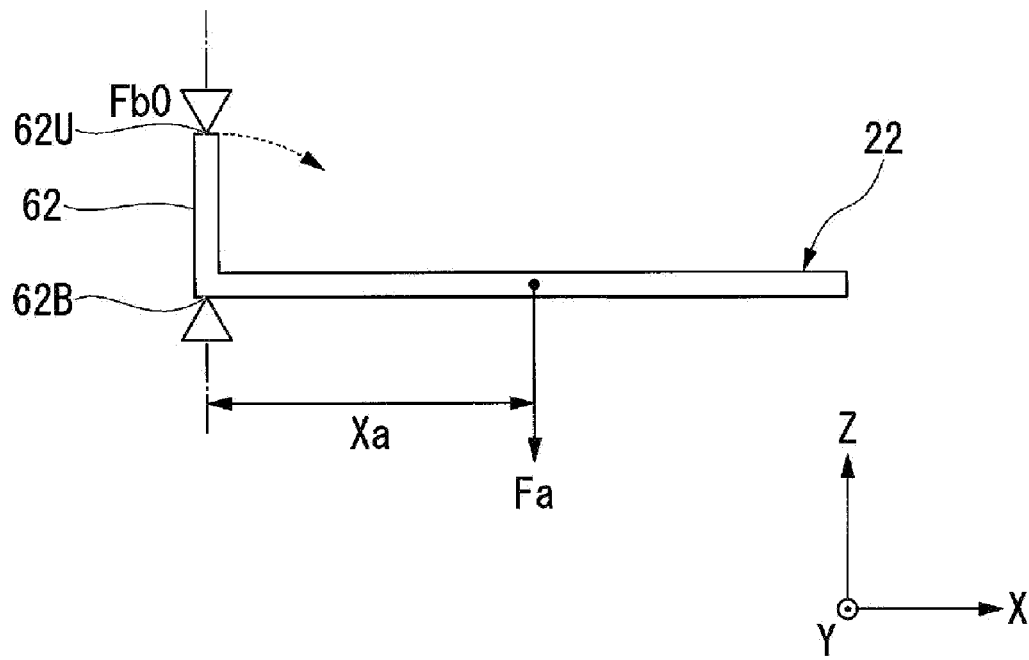
FIG. 9 are diagrams schematically showing balance of moments around a fourth end portion with respect to the load of the second housing in each of the vehicle lighting apparatus according to the first embodiment of the present invention and a comparative example.
Figure 9:
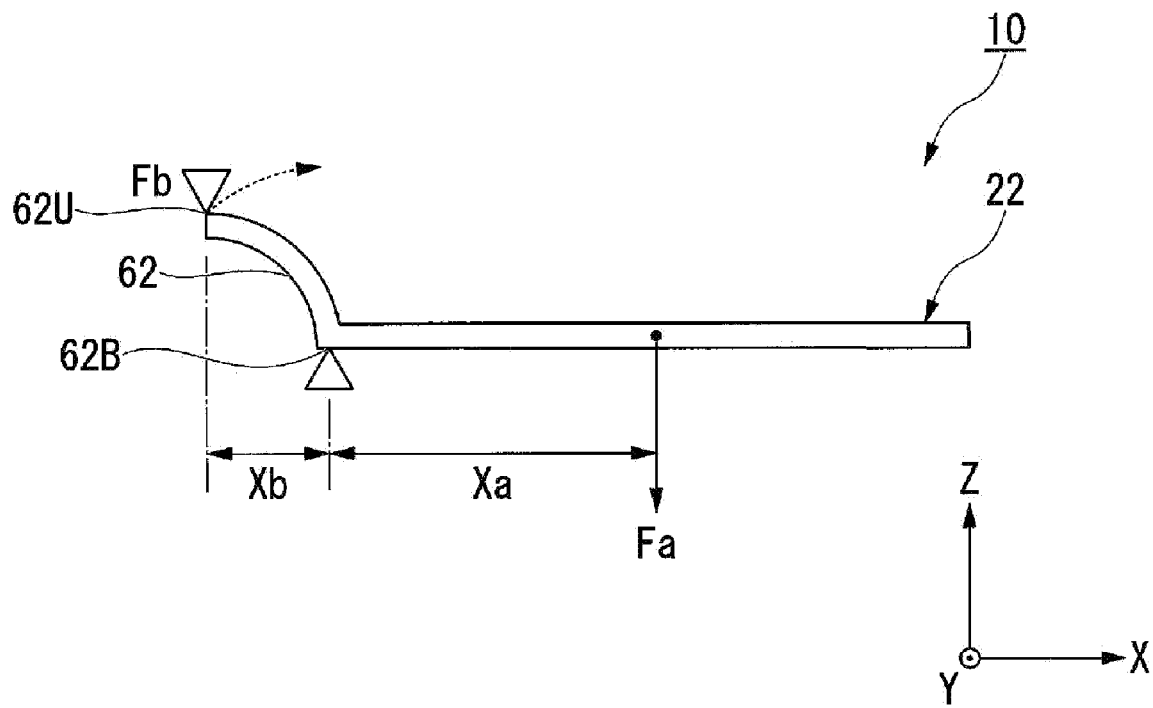

FIG. 9 are diagrams schematically showing the balance of moments around the fourth end portion 62B with respect to a load Fa of the second housing 22 in each of the vehicle lighting apparatus 10 according to the first embodiment and a comparative example. As shown in FIG. 9, in the vehicle lighting apparatus 10 according to the first embodiment, the third end portion 62U of the wall portion 62 is arranged on the first housing 21 side in the front-rear direction (X-axis direction) at a predetermined interval Xb from the fourth end portion 62B. On the other hand, in the comparative example, the third end portion 62U and the fourth end portion 62B of the wall portion 62 are arranged substantially in alignment with each other in the front-rear direction (X-axis direction).

With respect to the load Fa acting on the center of gravity position spaced at a predetermined interval Xa from the fourth end portion 62B of the second housing 22 in the front-rear direction, as in the vehicle lighting apparatus 10 according to the first embodiment, along with an increase in the distance between the third end portion 62U and the fourth end portion 62B in the front-rear direction, a reaction force (for example, vertical reaction force) Fb of the third end portion 62U tends to decrease due to the balance of moments around the fourth end portion 62B. On the other hand, as in the comparative example, along with a decrease in the distance between the third end portion 62U and the fourth end portion 62B in the front-rear direction, a reaction force (for example, vertical reaction force) Fb0 of the third end portion 62U tend to increase due to the balance of moments around the fourth end portion 62B. Accordingly, in the vehicle lighting apparatus 10 according to the first embodiment, the bearing capacity and rigidity required for the first end portion 43U of the first housing 21 and the third end portion 62U of the second housing 22 can be reduced as compared with the comparative example. In addition, with respect to the rotation around the fourth end portion 62B due to the load Fa of the second housing 22, the displacement direction of the third end portion 62U in the comparative example is the lower side in the vertical direction, whereas the displacement direction of the third end portion 62U in the vehicle lighting apparatus 10 according to the first embodiment is the upper side in the vertical direction. Accordingly, with respect to the first end portion 43U of the first housing 21 that engages with the third end portion 62U from the upper side to the lower side in the vertical direction, the first end portion 43U and the third end portion 62U can be firmly joined in the vehicle lighting apparatus 10 according to the first embodiment as compared with the comparative example.

Figure 10:
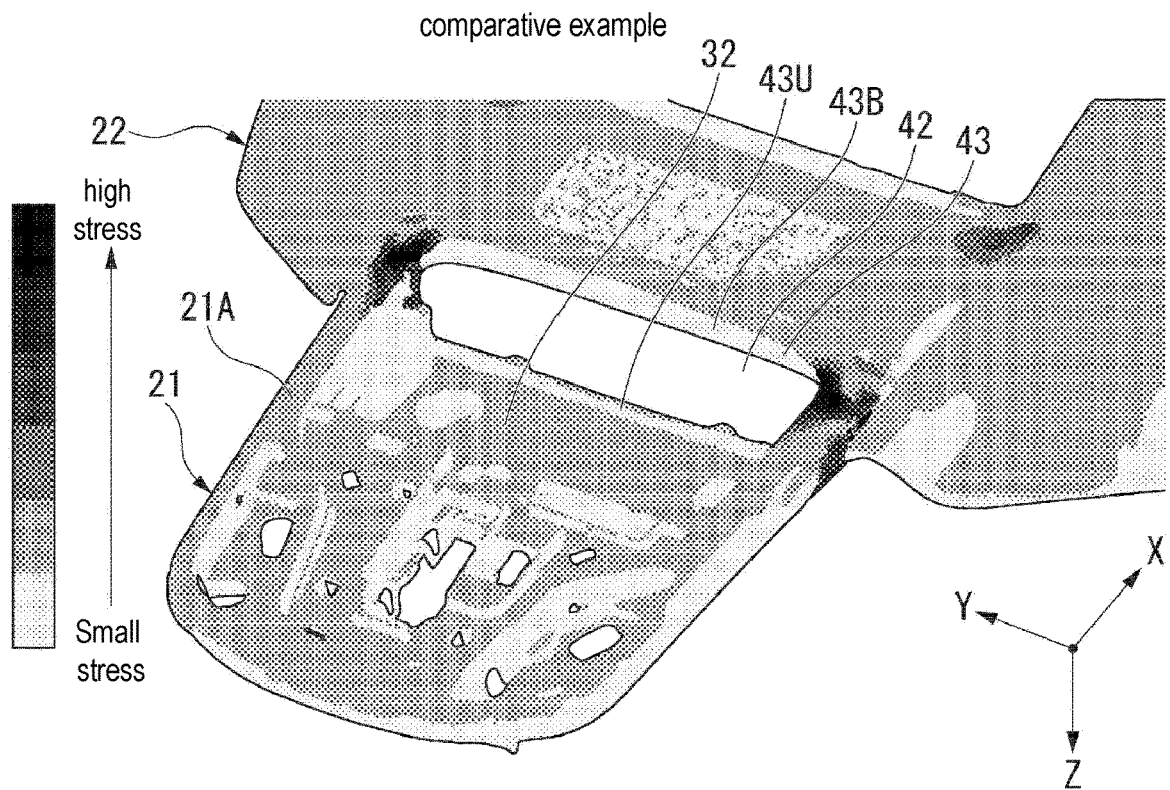
FIG. 10 are diagrams showing examples of stress distribution of the first housing and the second housing in the vehicle lighting apparatus according to the first embodiment of the present invention and the comparative example.
Figure 10:
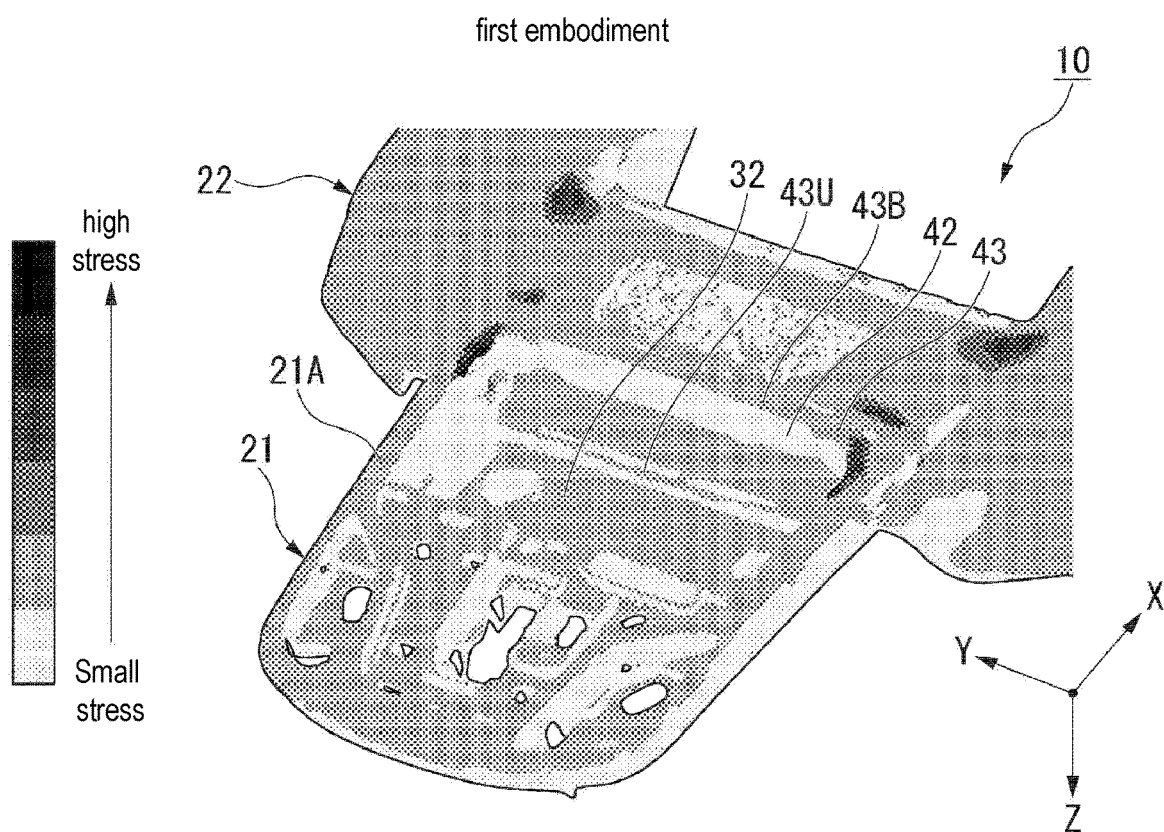

FIG. 10 are diagrams showing examples of stress distribution of the first housing 21 and the second housing 22 in the vehicle lighting apparatus 10 according to the first embodiment and the comparative example. As shown in FIG. 10, in the vehicle lighting apparatus 10 according to the first embodiment, the second housing 22 includes the wall portion 62 that closes the second opening portion 42 of the box portion 32 of the first housing 21. In contrast, in the comparative example, the wall portion 62 is omitted. In the second end portion 43B of the peripheral edge 43 of the second opening portion 42, for example, the stress on both end sides (left end side and right end side) in the left-right direction (Y-axis direction) is found to be increased in the comparative example as compared with the vehicle lighting apparatus 10 according to the first embodiment. More specifically, on both end sides (left end side and right end side) of the second end portion 43B in the left-right direction, the vehicle lighting apparatus 10 according to the first embodiment is found to have about 2.5 times the rigidity as compared with the comparative example. Accordingly, in the vehicle lighting apparatus 10 according to the first embodiment, the rigidity of the first housing 21 and the second housing 22 can be increased as compared with the comparative example.

The first end portion 43U of the first housing 21 is mechanically joined to the third end portion 62U of the second housing 22 by the combination of the claw portion 44 and the claw holding portion 63, and the second end portion 43B of the first housing 21 is mechanically joined to the fourth end portion 62B of the second housing 22 by the combination of the claw portion 45 and the claw holding portion 64. Accordingly, the configuration required for mechanical joining can be made more compact, for example, as compared with a case in which a screw, a boss with a screw hole, and the like are provided instead of the claw portions 44 and 45 and the claw holding portions 63 and 64. The plurality of second claw portions 45 of the second end portion 43B and the plurality of second claw holding portions 64 of the fourth end portion 62B regulate displacement and deformation of the first housing 21 and the second housing 22 in each of the vertical direction and the left-right direction. Accordingly, as compared with a case in which position regulation is performed in a plurality of directions by, for example, a single claw portion and a claw fixing portion, a desired precision for the position regulation can be ensured, and the alignment of the first housing 21 and the second housing 22 can be easily performed.

The two central side second claw holding portions 64A of the fourth end portion 62B and the two second claw portions 45 of the second end portion 43B fixed to the two central side second claw holding portions 64A regulate displacement and deformation of the first housing 21 and the second housing 22 in the vertical direction on the central side in the left-right direction. Accordingly, the occurrence of displacement or deformation in the vertical direction (for example, in the perpendicular direction) around the second end portion 43B and the fourth end portion 62B due to the load of the second housing 22 can be prevented.

The plurality of second claw portions 45 of the second end portion 43B in the first housing 21 are inserted into the plurality of through holes 65 of the fourth end portion 62B in the second housing 22 from the vehicle interior 2 side towards the inside of the second housing 22. Accordingly, the plurality of second claw portions 45 are prevented from protruding or being exposed to the vehicle interior 2 side, and the appearance design can be improved without deteriorating the aesthetic appearance of the first housing 21 and the second housing 22.

The second end portion 43B of the first housing 21 is arranged below the fourth end portion 62B so as to cover the fourth end portion 62B of the second housing 22 from the vehicle interior 2 side in the vertical direction. Accordingly, the joint boundary between the first housing 21 and the second housing 22 is prevented from being exposed to the vehicle interior 2 side, and the appearance design can be improved without deteriorating the aesthetic appearance of the first housing 21 and the second housing 22.

The upper third end portion 62U is arranged closer to the first housing 21 side than the lower fourth end portion 62B on the wall portion 62 of the second housing 22. Thus, for example, when a plurality of claw portions are arranged at the fourth end portion 62B, it is necessary to arrange the plurality of claw portions so as not to interfere with the wall portion 62. In this case, it may be difficult to provide the plurality of claw portions extending upward at the fourth end portion 62B, or the arrangement of the plurality of claw portions at the fourth end portion 62B may be complicated. In addition, for example, when a plurality of insertion holes having a plurality of claw portions inserted therein are formed at the second end portion 43B, the rigidity of the peripheral edge 43 of the second opening portion 42 in the box portion 32 of the first housing 21 may be deteriorated. Accordingly, a plurality of the second claw portions 45 are arranged at the second end portion 43B. In addition, a plurality of the through holes 65 in which the plurality of second claw holding portions 64 are arranged are formed at the fourth end portion 62B. Accordingly, it is possible to prevent the arrangement of the plurality of second claw portions 45 from getting complicated. In addition, a deterioration in the rigidity of the peripheral edge 43 of the second opening portion 42 in the box portion 32 of the first housing 21 can be prevented.

The first screw member 48 and the second screw member 50 regulate the displacement and deformation of the first housing 21 and the second housing 22 in other directions such as the front-rear direction in addition to the vertical direction and the left-right direction. Accordingly, the precision of position regulation of the first housing 21 and the second housing 22 can be enhanced.

The first housing 21 is formed relatively flexibly, and the second housing 22 is formed relatively highly rigid. Accordingly, the first housing 21 is arranged on the ceiling (the roof lining 4) of the vehicle 1 which is made of a flexible material such as cloth, leather, or the like. Accordingly, distortion of the shape of the ceiling can be suppressed. For example, an increase in weight can be suppressed and a rise in the cost required for the configuration can be prevented, as compared with a case in which the first housing 21 and the second housing 22 are made of polycarbonate resin.

Hereinafter, a variation example of the first embodiment is described.

VARIATION EXAMPLE

In the first embodiment described above, the second housing 22 includes, but is not limited to, the camera accommodating portion 61 and the wall portion 62, and may omit the camera accommodating portion 61.

Figure 11:
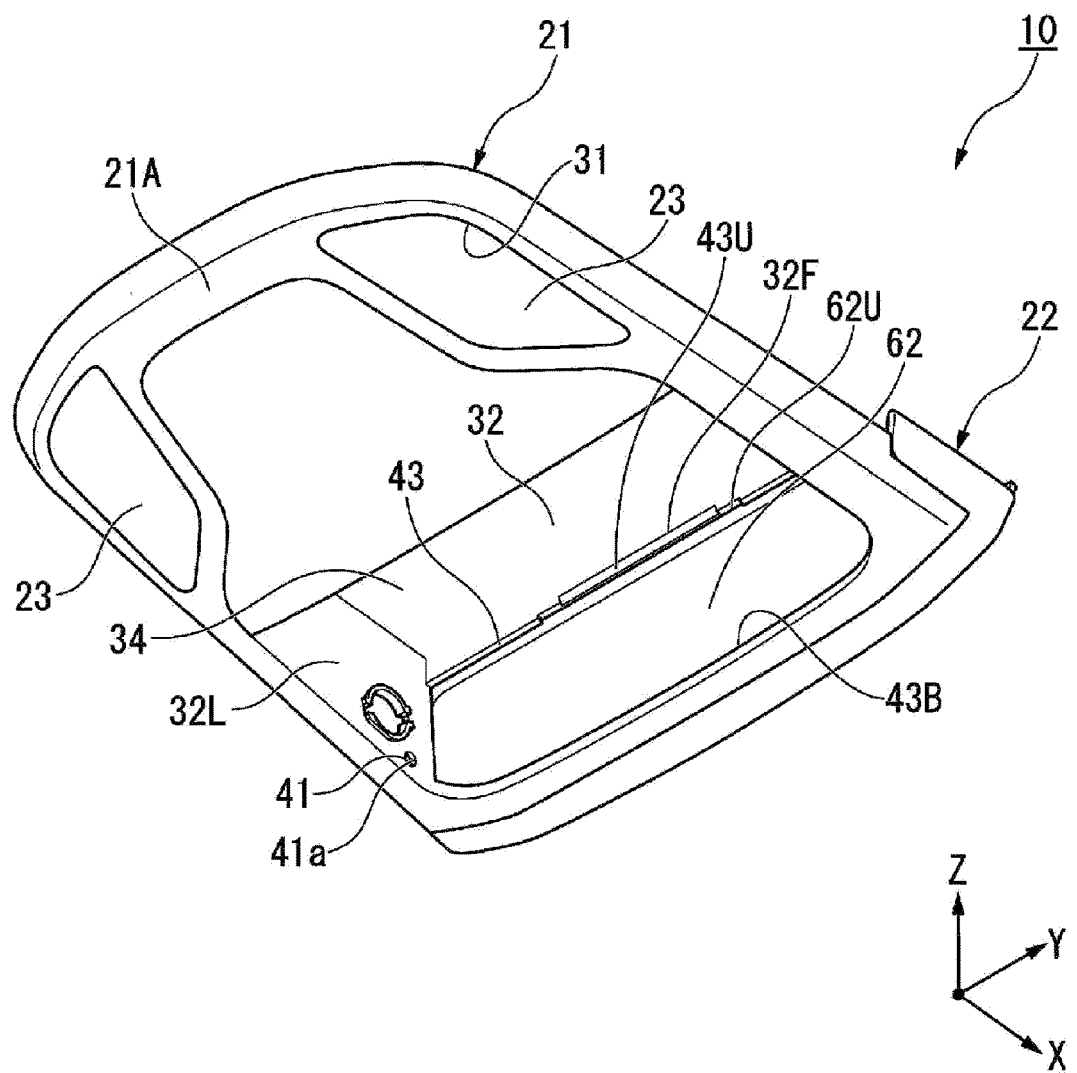
FIG. 11 is a perspective view of a box portion of a first housing of a vehicle lighting apparatus according to a variation example of the first embodiment of the present invention when viewed from a vehicle interior side.
Figure 12:
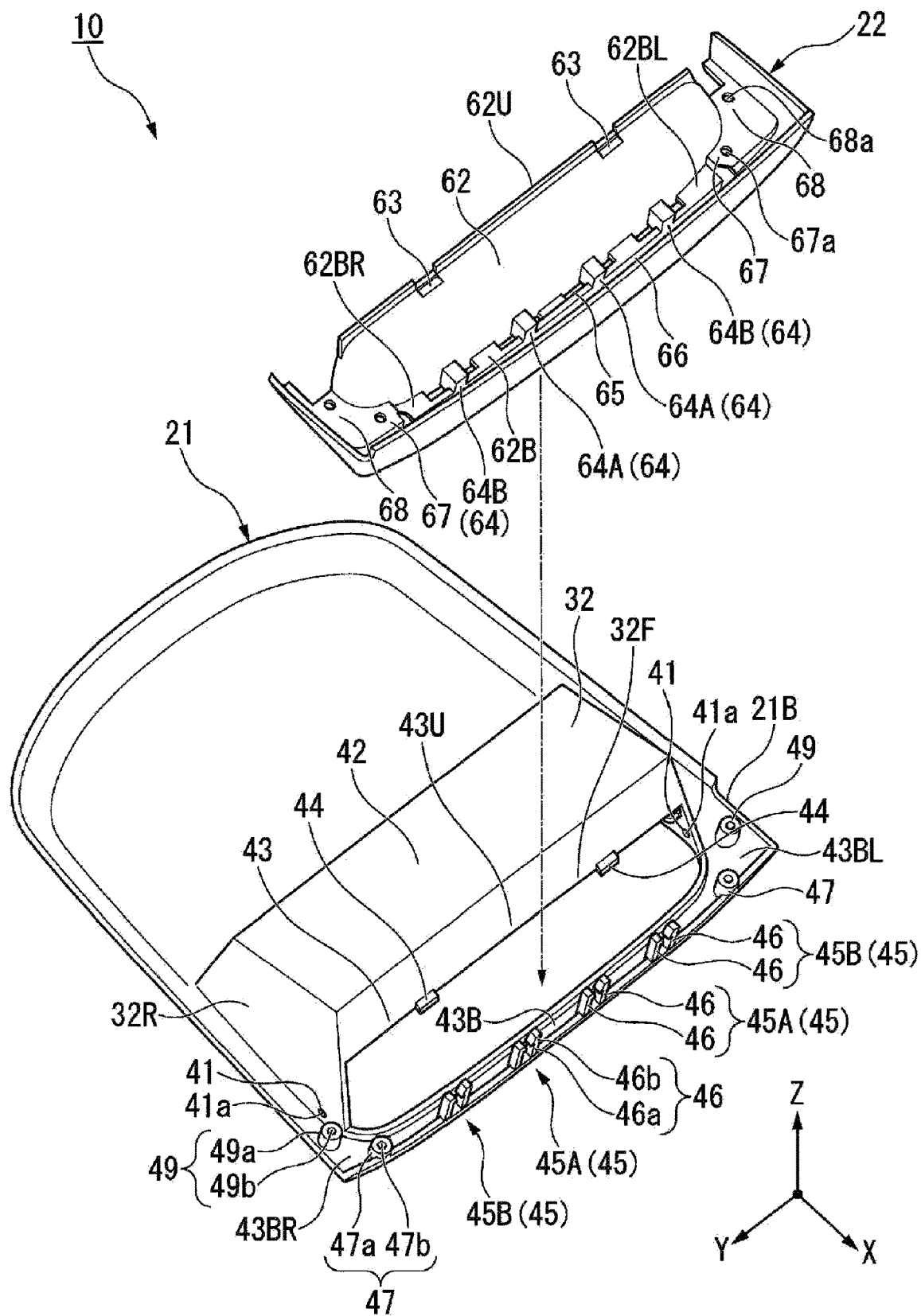
FIG. 12 are perspective views in which the first housing and a second housing of the vehicle lighting apparatus according to the variation example of the first embodiment of the present invention are shown in an exploded manner when viewed from a back surface side.

FIG. 11 is a perspective view of the box portion 32 of the first housing 21 of the vehicle lighting apparatus 10 according to a variation example of the first embodiment when viewed from the vehicle interior 2 side. FIG. 12 are perspective views in which the first housing 21 and the second housing 22 of the vehicle lighting apparatus 10 according to the variation example of the first embodiment t are shown in an exploded manner when viewed from the back surface 21B side.

Figure 13:
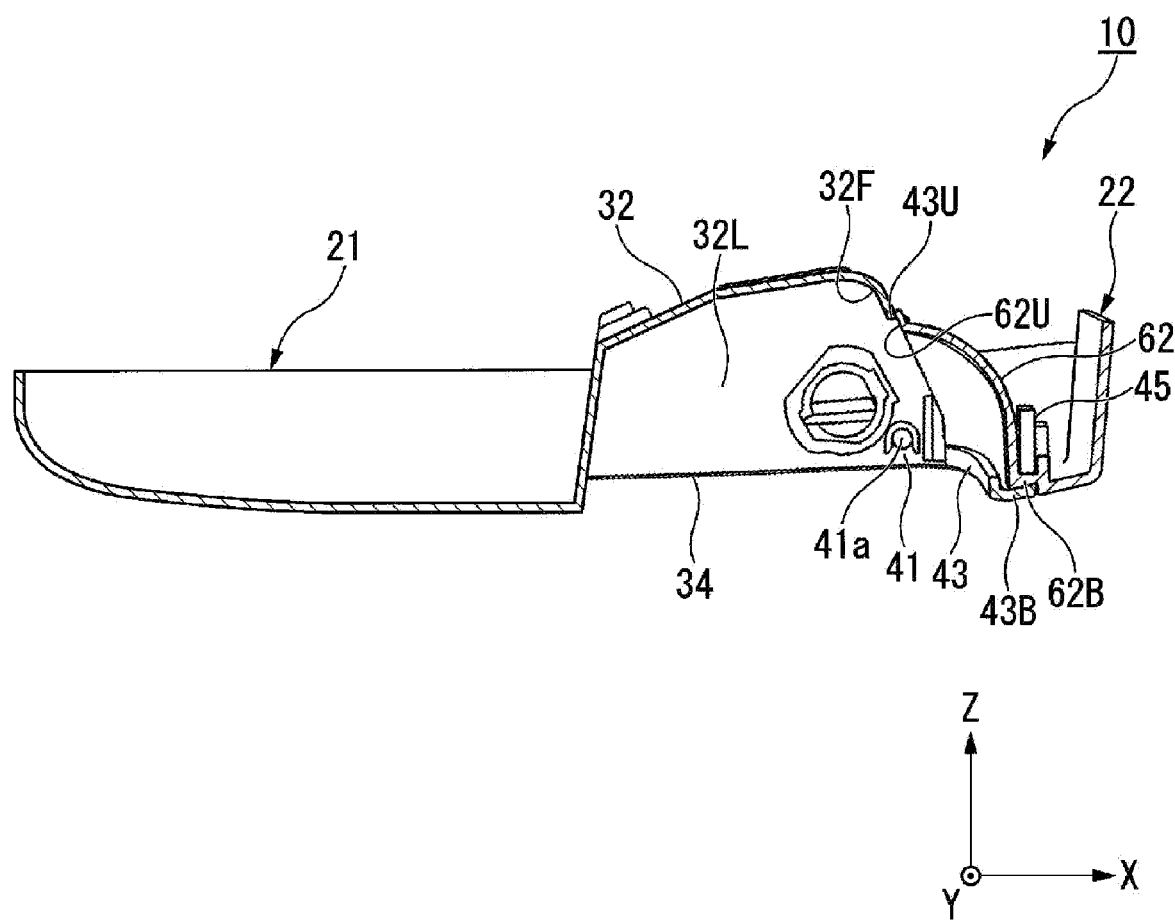
FIG. 13 is a cross-sectional view of an X-Z plane of the vehicle lighting apparatus according to the variation example of the first embodiment of the present invention.

FIG. 13 is a cross-sectional view of an X-Z plane of the vehicle lighting apparatus 10 according to the variation example of the first embodiment.

In the vehicle lighting apparatus 10 according to the variation example, the second housing 22 is made of, for example, a resin material having an excellent balance of mechanical properties such as rigidity, hardness, or the like, such as a synthetic resin of polycarbonate resin and acrylonitrile-butadiene-styrene resin or acrylonitrile-butadiene-styrene resin.

According to the variation example, the first housing 21 and the second housing 22 are formed separately. This enables individual settings for the material, processing method, weight, rigidity, design, color, and the like. Accordingly, it is possible to easily cope with diversification of specifications such as the presence or absence of the camera accommodating portion 61 or the like. In addition, the specifications of the first housing 21 and the second housing 22 can be diversified and the ease of manufacturing can be improved.

The first housing 21 is formed relatively flexibly, and the second housing 22 is formed with a relatively excellent balance of mechanical properties such as rigidity, hardness, or the like. Accordingly, the fluidity during molding processing can be improved as compared with, for example, a case in which the first housing 21 and the second housing 22 are made of polycarbonate resin. In addition, the occurrence of structurally weak parts such as weld lines or the like and poor appearance parts can be suppressed and the ease of manufacturing can be improved.

In the first embodiment described above, the first housing 21 includes a plurality of the first claw portions 44 at the first end portion 43U, and the second housing 22 includes a plurality of the first claw holding portions 63 at the third end portion 62U, but the present invention is not limited thereto.

For example, the second housing 22 may include a plurality of third claw portions at the third end portion 62U, and the first housing 21 may include, at the first end portion 43U, a plurality of third claw holding portions to which the plurality of third claw portions are engaged.

In the first embodiment described above, the first housing 21 includes a plurality of second claw portions 45 at the second end portion 43B, and the second housing 22 includes a plurality of the second claw holding portions 64 at the fourth end portion 62B, but the present invention is not limited thereto.

For example, the second housing 22 may include a plurality of fourth claw portions at the fourth end portion 62B, and the first housing 21 may include, at the end portion 43B, a plurality of fourth claw holding portions to which the plurality of fourth claw portions are engaged.

In the first embodiment described above, the first end portion 43U of the first housing 21 is mechanically joined to the third end portion 62U of the second housing 22 by the combination of the claw portion 44 and the claw holding portion 63, and the second end portion 43B of the first housing 21 is mechanically joined to the fourth end portion 62B of the second housing 22 by the combination of the claw portion 45 and the claw holding portion 64, but the present invention is not limited thereto.

For example, at least one of the joining of the first end portion 43U of the first housing 21 and the third end portion 62U of the second housing 22, and the joining of the second end portion 43B of the first housing 21 and the fourth end portion 62B of the second housing 22 may be accomplished by another configuration, such as a combination of a screw and a boss with a screw hole. In addition, for example, at least one of the joining of the first end portion 43U of the first housing 21 and the third end portion 62U of the second housing 22, and the joining of the second end portion 43B of the first housing 21 and the fourth end portion 62B of the second housing 22 may be accomplished by, for example, a method other than mechanical joining, such as welding or the like.

In the first embodiment and the variation example described above, the second end portion 43B of the first housing 21 is arranged below the fourth end portion 62B of the second housing 22, but the present invention is limited thereto. Instead, the second end portion 43B of the first housing 21 may be arranged above the fourth end portion 62B of the second housing 22.

In the first embodiment described above, the vehicle lighting apparatus 10 includes, but is not limited to, two external cameras 24, and may additionally include other detection devices, or may include other detection devices instead of the two external cameras 24.

The other detection device is, for example, a radar that detects the distance and direction to a detection target using radio waves such as millimeter waves or the like, a laser range sensor that uses light to detect the distance to a detection target, or the like. The laser range sensor is, for example, LIDAR (Light Detection and Ranging or Laser Imaging Detection and Ranging).

The other detection device may also be, for example, a camera that detects an occupant or the like in the vehicle interior 2.

Next, a second embodiment is described with reference to the accompanying drawings.

Second Embodiment (Vehicle Lighting Apparatus)

Figure 14:
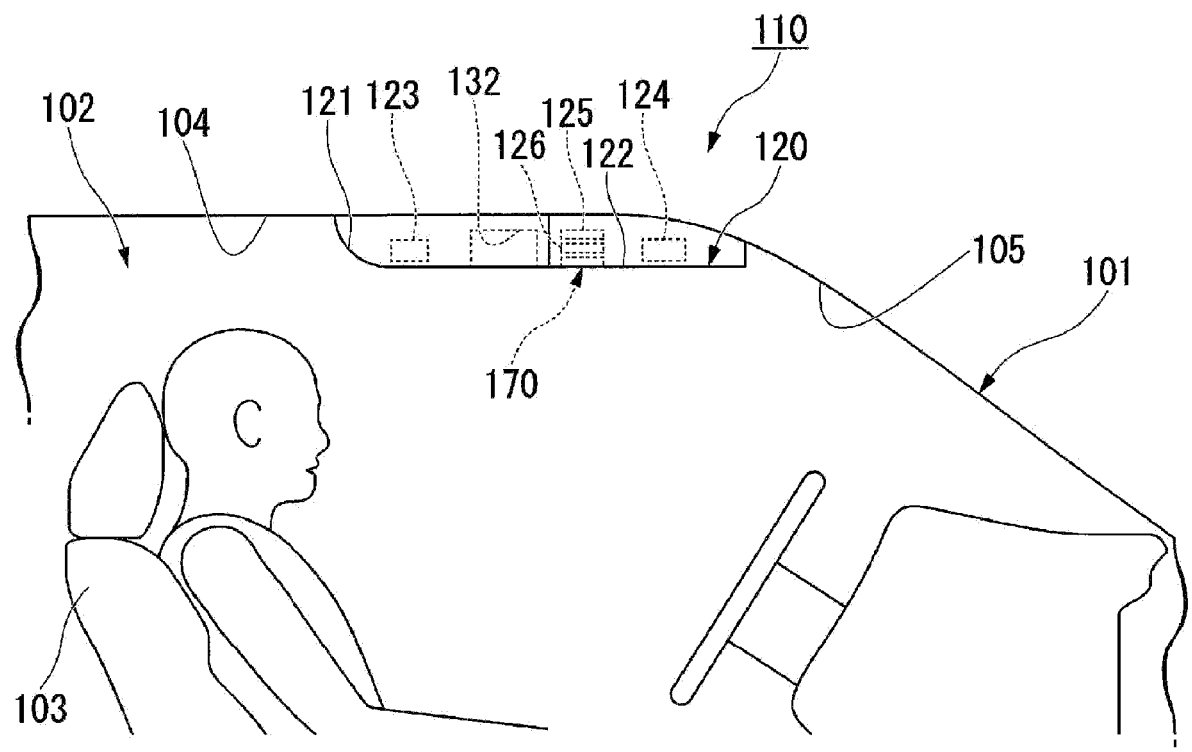
FIG. 14 is a side view of a vehicle when viewed from a left-right direction, showing the configuration of a vehicle lighting apparatus according to a second embodiment of the present invention.
Figure 15:
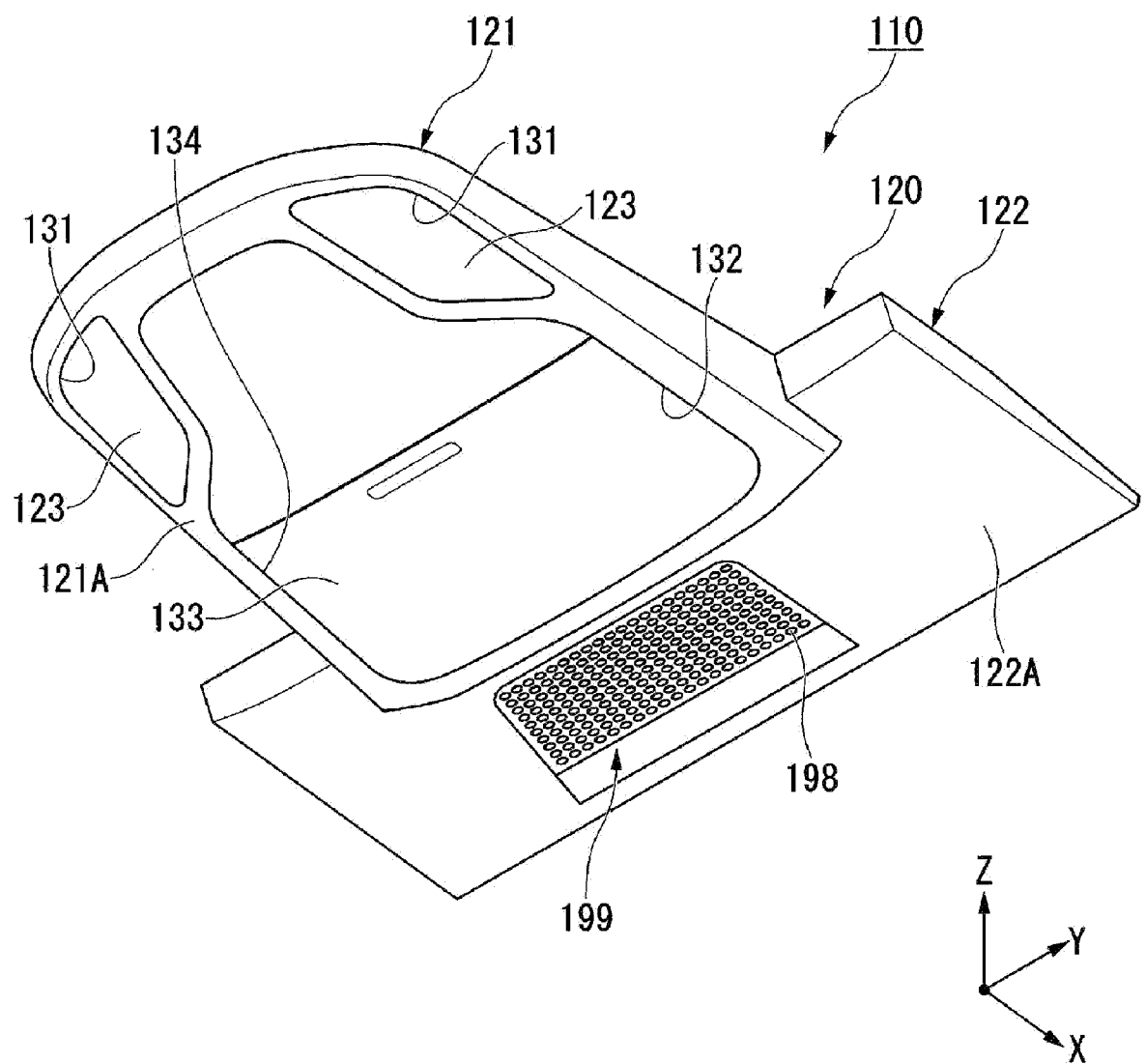
FIG. 15 is a perspective view showing the configuration of the vehicle lighting apparatus according to the second embodiment of the present invention.

FIG. 14 is a side view of a vehicle 101 when viewed from the left-right direction, showing the configuration of a vehicle lighting apparatus 110 according to a second embodiment. FIG. 15 is a perspective view showing the configuration of the vehicle lighting apparatus 110 according to the second embodiment.

As shown in FIG. 14, the vehicle lighting apparatus 110 of the second embodiment is arranged on the upper portion of a front seat 103 in a vehicle interior 102 of the vehicle 101. The upper portion of the vehicle interior 102 refers to, for example, a roof lining 104 corresponding to the ceiling, the upper portion of a front window 105, and the like.

As shown in FIG. 14 and FIG. 15, the vehicle lighting apparatus 110 includes a first housing 121 and a second housing 122 that constitute a cover 120, two lamp bodies 123, two external cameras 124, a control device 125 and a cooling fan 126.

The first housing 121 and the second housing 122 are formed separately from each other. The first housing 121 and the second housing 122 are joined in a state of being adjacent in the front-rear direction (X-axis direction), and are arranged so as to cover a portion of the upper portion of the vehicle interior 102. The second housing 122 corresponds to a cover body in the claims.

Figure 16:
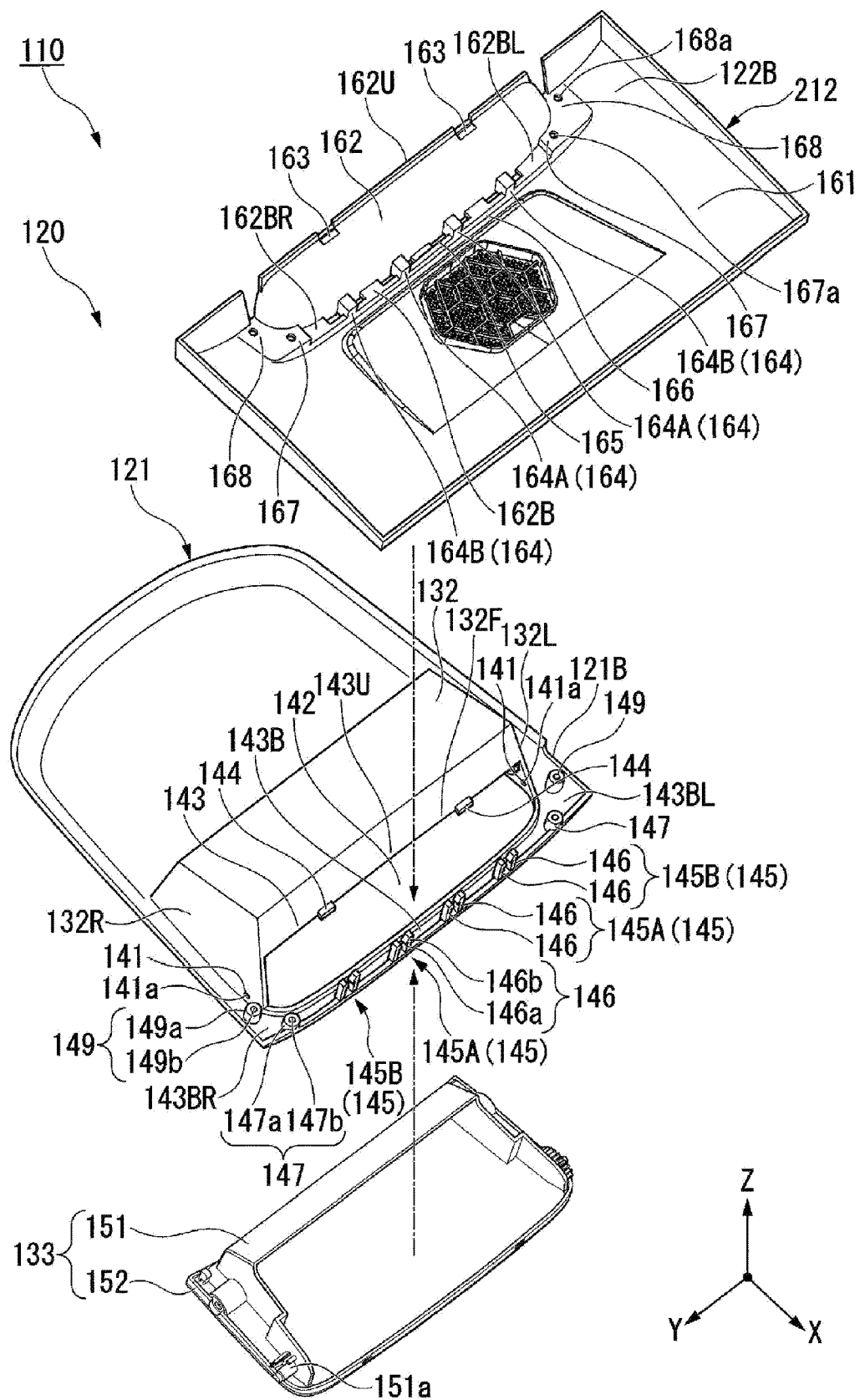
FIG. 16 are perspective views in which a first housing and a second housing of a cover and a lid member of the vehicle lighting apparatus according to the second embodiment of the present invention are shown in an exploded manner when viewed from a back surface side.
Figure 17:
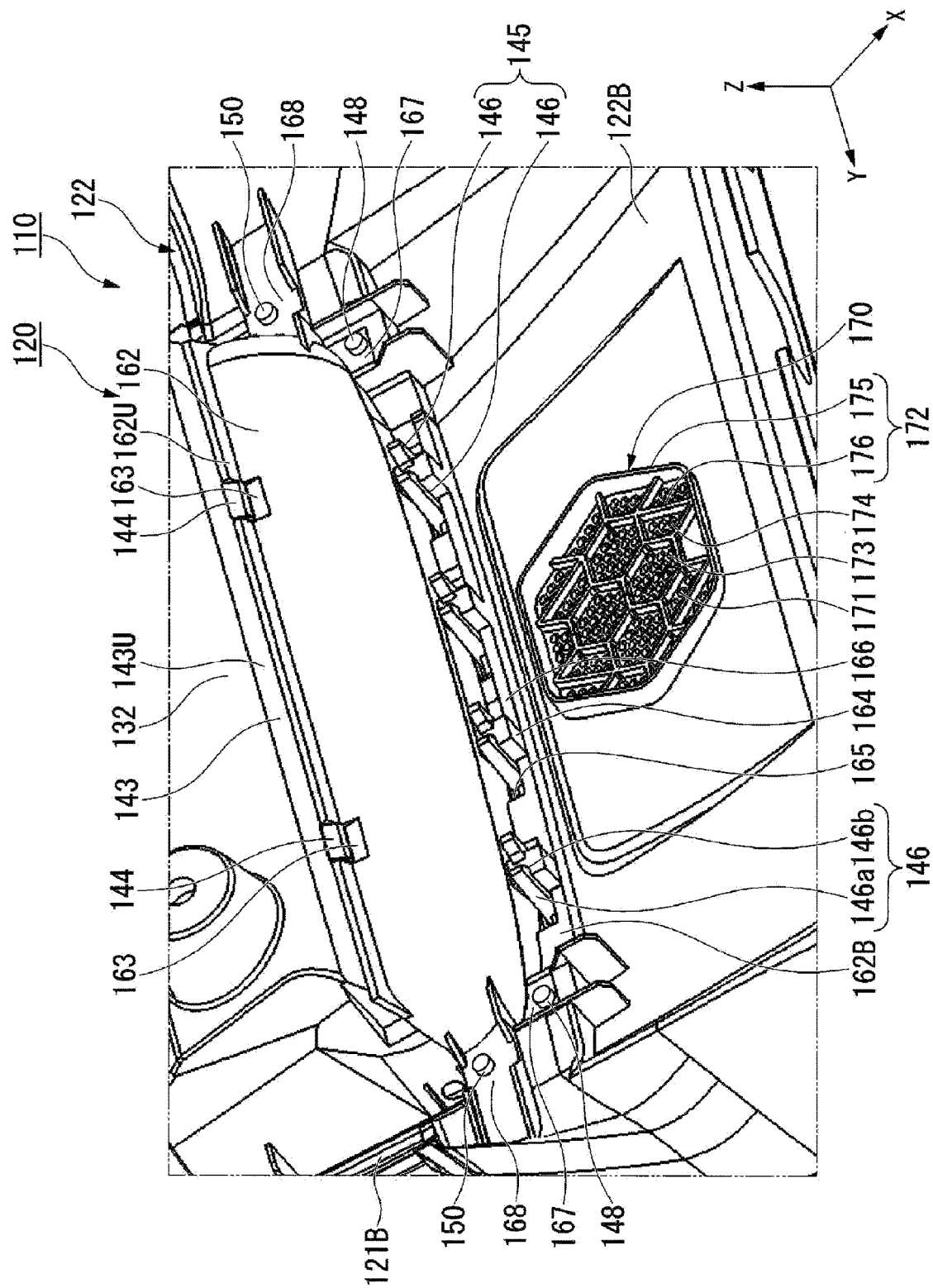
FIG. 17 is an enlarged perspective view of the cover of the vehicle lighting apparatus according to the second embodiment of the present invention when viewed from a back surface side.
Figure 18:
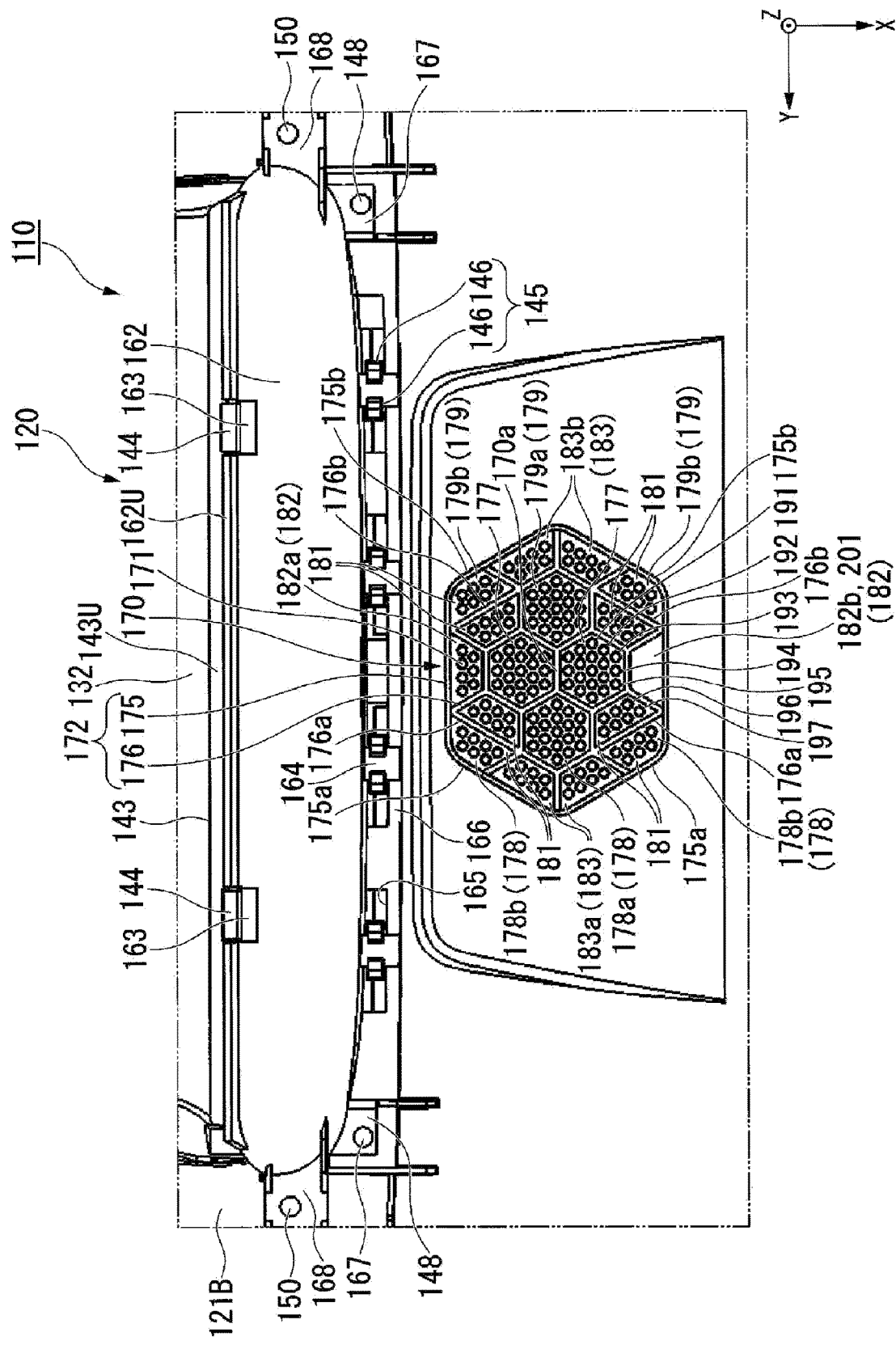
FIG. 18 is a view of a ventilation portion of the cover of the vehicle lighting apparatus according to the second embodiment of the present invention when viewed from a back surface side.
Figure 19:
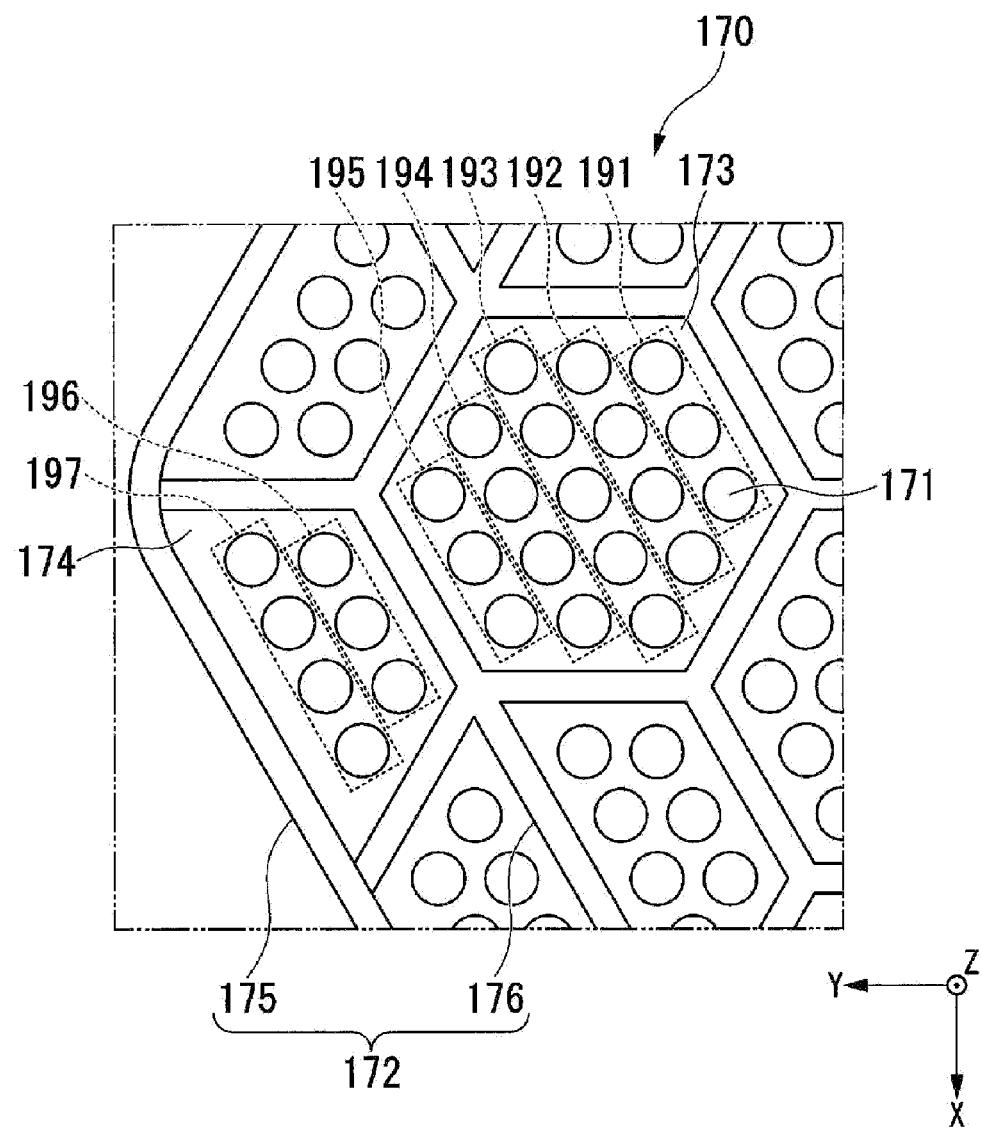
FIG. 19 is an enlarged view of the ventilation portion of the cover of the vehicle lighting apparatus according to the second embodiment of the present invention.
Figure 20:
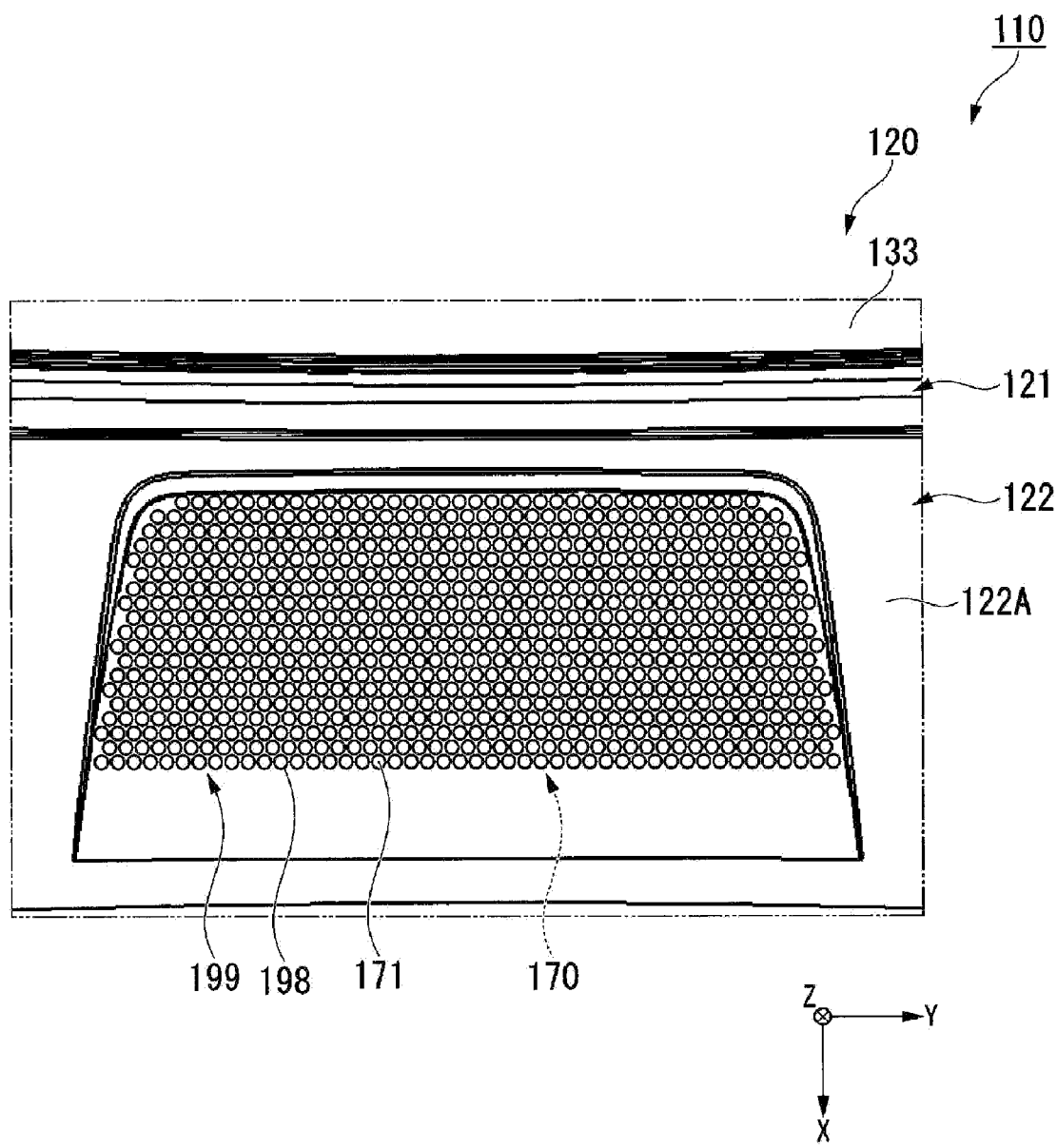
FIG. 20 is a view of the ventilation portion of the cover of the vehicle lighting apparatus according to the second embodiment of the present invention when viewed from a front surface side.

FIG. 16 are perspective views in which the first housing 121 and the second housing 122 of the cover 120 and a lid member 133 of the vehicle lighting apparatus 110 according to the second embodiment are shown in an exploded manner when viewed from a back surface 121B side. FIG. 17 is an enlarged perspective view of the cover according to the second embodiment when viewed from the back surface 121B side. FIG. 18 is a view of a ventilation portion 170 of the cover 120 according to the second embodiment when viewed from the back surface 122B side. FIG. 19 is a view of the ventilation portion 170 of the cover 120 according to the second embodiment when viewed from a surface 122A side. FIG. 20 is an enlarged view of the ventilation portion 170 of the cover 120 according to the second embodiment.

As shown in FIGS. 14 to 20, the outer shape of the first housing 121 is formed in, for example, a box shape provided with a plurality of opening portions. The first housing 121 is made of a highly flexible resin material such as polypropylene resin or acrylonitrile-butadiene-styrene resin. The first housing 121 is arranged so as to cover a portion of the roof lining 104.

The first housing 121 includes two first accommodating portions 131, a box portion 132, and the lid member 133.

The outer shape of each of the two first accommodating portions 131 is formed in, for example, a concave shape that is recessed upward in the vertical direction (positive direction in the Z-axis direction) on a surface 121A exposed to the vehicle interior 102 side of the first housing 121. The two first accommodating portions 131 are arranged on the rear side (negative direction in the X-axis direction) of the first housing 121 in the front-rear direction. Each of the two first accommodating portions 131 accommodates the lamp body 123.

The outer shape of the box portion 132 is formed in, for example, a concave shape that is recessed upward on the surface 121A of the first housing 121 in the vertical direction. Accordingly, a first opening portion 134 is formed in the first housing 121 so as to communicate with the inside of the box portion 132 from the vehicle interior 102 side.

The box portion 132 constitutes a console box of a so-called overhead console, and is arranged on the front side of the first housing 121 in the front-rear direction (positive direction side in the X-axis direction). The box portion 132 accommodates the lid member 133, which openably closes the first opening portion 134, so that the lid member 133 can be pulled out to the vehicle interior 102 side.

The box portion 132 includes, at each front part in the front-rear direction of a left side end portion 132L and a right side end portion 132R in the left-right direction (Y-axis direction), a shaft support portion 141 that supports a rotary shaft 151a of the lid member 133 to be rotatable, and the shaft support portion 141 is described later. For example, the shaft support portion 141 is formed with a shaft insertion hole 141a into which the rotary shaft 151a of the lid member 133 is inserted in a rotatable manner.

A second opening portion 142 is formed at a front side end portion 132F of the box portion 132 in the front-rear direction. The box portion 132 includes a plurality of (for example, two) first claw portions 144 at an upper first end portion 143U in the vertical direction of a peripheral edge 143 forming the second opening portion 142. For example, the two first claw portions 144 protrude forward in the front-rear direction at predetermined intervals in the left-right direction. Each first claw portion 144 is mechanically joined to a first claw holding portion 163 of the second housing 122, which is described later, by a so-called cantilever type snap fit. Each of the first claw portions 144 engages with the first claw holding portion 163 by elasticity. Accordingly, the first housing 121 and the second housing 122 are fixed to each other.

The box portion 132 includes a plurality of (for example, four) second claw portions 145 at a lower second end portion 143B of the peripheral edge 143 of the second opening portion 142 in the vertical direction. For example, the four second claw portions 145 are arranged at predetermined intervals in the left-right direction. Each second claw portion 145 includes a pair of claw pieces 146 that are separated from each other in the left-right direction and protrude upward in the vertical direction. Each claw piece 146 includes, for example, as shown in FIG. 16, a leg portion 146a extending in the vertical direction and a head portion 146b protruding from the front end portion of the leg portion 146a in the left-right direction. The pair of claw pieces 146 are arranged in a manner that the head portions 146b of each other protrude in the opposite directions in the left-right direction.

The pair of claw pieces 146 of each second claw portion 145 are mechanically joined to a second claw holding portion 164 (for example, a central side second claw holding portion 164A or an end portion side second claw holding portion 164B) of the second housing 122, which is described later, by the so-called cantilever type snap fit. The pair of claw pieces 146 are arranged so as to sandwich the second claw holding portion 164 from both sides in the left-right direction, and abuts each head portion 146b or each leg portion 146a against the second claw holding portion 164 by the elasticity of the leg portion 146a. Accordingly, the first housing 121 and the second housing 122 are fixed to each other.

Each claw piece 146 of two central side second claw portions 145A of the four second claw portions 145 that are arranged at the central side of the second end portion 143B in the left-right direction abuts the head portion 146b against the second claw holding portion 164 (the central side second claw holding portion 164A) from the upper side to the lower side in the vertical direction by the elasticity of the leg portion 146a. Accordingly, the positions of the first housing 121 and the second housing 122 in the vertical direction are regulated.

Each claw piece 146 of two end portion side second claw portions 145B of the four second claw portions 145 that are arranged at both end sides (a left end 143BL side and a right end 143BR side) of the second end portion 143B in the left-right direction abuts the leg portion 146a against the second claw holding portion 164 (the end portion side second claw holding portion 164B) from the left-right direction by the elasticity of the leg portion 146a. Accordingly, the positions of the first housing 121 and the second housing 122 in the left-right direction are regulated.

The box portion 132 includes two first screw mounting portions 147 that are arranged closer to both end sides (the left end 143BL side and the right end 143BR side) than the four second claw portions 145 at the second end portion 143B of the peripheral edge 143 of the second opening portion 142 in the left-right direction. Each first screw mounting portion 147 includes, for example, a first boss 147a protruding upward in the vertical direction. The first boss 147a is formed with first screw holes 147b that are aligned facing first screw insertion holes 167a of the second housing 122, which are described later.

The vehicle lighting apparatus 110 includes a first screw member 148 that is inserted into the first screw insertion hole 167a and screwed into the first screw hole 147b. The first screw member 148 fixes the first housing 121 and the second housing 122 to each other, and regulates the positions of the first housing 121 and the second housing 122 in any other direction in addition to the vertical direction and the left-right direction.

The first housing 121 includes two second screw mounting portions 149 that are arranged closer to both end sides (left end side and right end side) than the two first screw mounting portions 147 around the box portion 132 in the left-right direction. Each second screw mounting portion 149 includes, for example, a second boss 149a protruding upward in the vertical direction from the back surface 121B of the first housing 121. The second boss 149a is formed with second screw holes 149b that are aligned facing second screw insertion holes 168a of the second housing 122, which are described later.

The vehicle lighting apparatus 110 includes a second screw member 150 that is inserted into the second screw insertion hole 168a and screwed into the second screw hole 149b. The second screw member 150 fixes the first housing 121 and the second housing 122 to each other, and regulates the positions of the first housing 121 and the second housing 122 in any other direction in addition to the vertical direction and the left-right direction.

The lid member 133 includes a case 151 and a cover 152.

The outer shape of the case 151 is formed in, for example, an open box shape. The case 151 accommodates an appropriate object, such as sunglasses or the like worn by an occupant of the vehicle 101. The case 151 includes a rotary shaft 151a extending in the left-right direction at an end portion on the front side in the front-rear direction. The rotary shaft 151a is inserted into the shaft insertion hole 141a of the box portion 132. The case 151 rotates around the axis of the rotary shaft 151a. Accordingly, the case 151 is pulled out from the inside of the box portion 132 to the side of the vehicle interior 102, or is accommodated inside the box portion 132 from the vehicle interior 102 side.

The cover 152 is attached to the case 151 so as to cover the lower surface of the case 151 (the surface facing the vehicle interior 102 side at the lower portion in the vertical direction). The cover 152 openably closes the first opening portion 134 of the first housing 121 as the case 151 rotates. The cover 152 closes the first opening portion 134 when the case 151 is accommodated inside the box portion 132. and releases the closing of the first opening portion 134 when the case 151 is pulled out from the inside of the box portion 132 to the vehicle interior 102 side.

As shown in FIGS. 14 to 19, the outer shape of the second housing 122 is formed in, for example, an open box shape. The second housing 122 is made of a highly rigid resin material such as a polycarbonate resin or the like. The second housing 122 is arranged so as to cover a portion of the upper portion of the front window 105.

The second housing 122 includes a second accommodating portion 161 and a wall portion 162.

The outer shape of the second accommodating portion 161 is formed in, for example, a box shape that opens upward in the vertical direction and forward in the front-rear direction. The second accommodating portion 161 is arranged on the front side of the second housing 122 in the front-rear direction. The second accommodating portion 161 accommodates two external cameras 124 that are arranged apart from each other in the left-right direction, and the control device 125 and the cooling fan 126 that are arranged on the central side in the second housing 122 in the left-right direction.

The outer shape of the wall portion 162 is formed in, for example, a plate shape that is curved along the rotation locus of the front end (end portion on the front side in the front-rear direction) of the lid member 133 in the box portion 132 of the first housing 121. The wall portion 162 is arranged on the rear side of the second housing 122 in the front-rear direction. The wall portion 162 closes the second opening portion 142 of the box portion 132 of the first housing 121.

The upper third end portion 162U of the wall portion 162 in the vertical direction is arranged on the first housing 121 side in the front-rear direction relatively behind the lower fourth end portion 162B of the wall portion 162 in the vertical direction.

The wall portion 162 includes a plurality of (for example, two) first claw holding portions 163 at the upper third end portion 162U in the vertical direction. For example, the two first claw holding portions 163 are arranged at predetermined intervals in the left-right direction. The outer shape of each first claw holding portion 163 is formed into, for example, a concave shape in which each first claw portion 144 of the first housing 121 is engaged (stopped in an engaged state) from the upper side to the lower side in the vertical direction. The first housing 121 and the second housing 122 are fixed to each other by mutual engagement of each first claw portion 144 and each first claw holding portion 163.

The wall portion 162 includes a plurality of (for example, four) second claw holding portions 164 at the lower fourth end portion 162B in the vertical direction. For example, the four second claw holding portions 164 are arranged at predetermined intervals in the left-right direction. The fourth end portion 162B is formed with a plurality of (for example, four) through hole 165 into which a plurality of (for example, four) second claw portions 145 of the first housing 121 are inserted from the vehicle interior 102 side toward the inside of the second housing 122. For example, the four through holes 165 are arranged at predetermined intervals in the left-right direction. Each second claw holding portion 164 is formed so as to extend upward in the vertical direction from an edge 166 of each through hole 165 on the central side of each through hole 165 in the left-right direction. The outer shape of each second claw holding portion 164 is formed into a columnar shape which extends upward from the edge 166 in the vertical direction and in which each second claw portion 145 is engaged in the vertical direction or the left-right direction.

The second end portion 143B of the first housing 121 having the plurality of second claw portions 145 is arranged so as to overlap, from the vehicle interior 102 side, that is, the lower side in the vertical direction, the fourth end portion 162B of the second housing 122 in which a plurality of the through holes 165 are formed. Accordingly, the pair of claw pieces 146 of each second claw portion 145 are inserted into each through hole 165 from the lower side toward the upper side in the vertical direction toward the inside of the second housing 122, so as to sandwich each second claw holding portion 164 from both sides in the left-right direction. The first housing 121 and the second housing 122 are fixed to each other by engaging the pair of claw pieces 146 of each second claw portion 145 with each second claw holding portion 164 in the vertical direction or the left-right direction.

The two central side second claw holding portions 164A of the four second claw holding portions 164 that are arranged on the central side of the fourth end portion 162B in the left-right direction abut against the two second claw portions 145 (the central side second claw portions 145A) in the vertical direction. Accordingly, the positions of the first housing 121 and the second housing 122 in the vertical direction are regulated. The two end portion side second claw holding portions 164B of the four second claw holding portions 164 that are arranged at both end sides (a left end 162BL side and a right end 162BR side) of the fourth end portion 162B in the left-right direction abut against the two second claw portions 145 (the end portion side second claw portions 145B) in the left-right direction. Accordingly, the positions of the first housing 121 and the second housing 122 in the left-right direction are regulated.

The second housing 122 includes two third screw mounting portions 167 that are arranged closer to both end sides (left end side and right end side) than the four second claw holding portions 164 around the wall portion 162 in the left-right direction. Each of the third screw mounting portions 167 is formed with, for example, the first screw insertion holes 167a that are aligned facing the first screw holes 147b of each first screw mounting portion 147 of the first housing 121. As described above, each first screw member 148 inserted into each first screw insertion hole 167a is screwed into each first screw hole 147b. Accordingly, the first housing 121 and the second housing 122 are fixed.

The second housing 122 includes two fourth screw mounting portions 168 that are arranged closer to both end sides (left end side and right end side) than the two third screw mounting portions 167 around the wall portion 162 in the left-right direction. Each of the fourth screw mounting portions 168 is formed with, for example, the second screw insertion holes 168a that are aligned facing the second screw holes 149b of each second screw mounting portion 149 of the first housing 121. As described above, each second screw member 150 inserted into each second screw insertion hole 168a is screwed into each second screw hole 149b. Accordingly, the first housing 121 and the second housing 122 are fixed.

When joining the first housing 121 and the second housing 122, first, each first claw portion 144 is engaged with each first claw holding portion 163 at the first end portion 143U of the first housing 121 and the third end portion 162U of the second housing 122. Next, each second claw portion 145 is engaged with each second claw holding portion 164 at the second end portion 143B of the first housing 121 and the fourth end portion 162B of the second housing 122.

Then, each first screw mounting portions 147 of the first housing 121 and each third screw mounting portion 167 of the second housing 122 are fixed by the first screw member 148. In addition, each second screw mounting portion 149 of the first housing 121 and each fourth screw mounting portion 168 of the second housing 122 are fixed by the second screw member 150.

The second housing 122 includes a ventilation portion 170 having a plurality of ventilation holes 171. The outer shape of the ventilation portion 170 is formed into, for example, a hexagonal shape that has opposite sides facing each other in the front-rear direction and parallel to each other in the left-right direction and is line-symmetric with respect to the center line extending in the front-rear direction. The ventilation portion 170 is arranged on the central side of the second housing 122 in the left-right direction, and is arranged facing the control device 125 in the vertical direction via the cooling fan 126. Each of the plurality of ventilation holes 171 penetrates the second housing 122 in the vertical direction. The ventilation holes 171 correspond to through holes in the claims. The vertical direction corresponds to a predetermined direction in the claims. The ventilation portion 170 includes a wall portion 172 arranged on the back surface 122B of the second housing 122, a plurality of hexagonal regions 173 and a plurality of trapezoidal regions 174 partitioned by the wall portion 172.

The wall portion 172 protrudes upward from the back surface 122B of the second housing 122 toward the control device 125 in the vertical direction. The wall portion 172 includes an outer wall portion 175 arranged on the peripheral edge of the ventilation portion 170, and an inner wall portion 176 surrounded by the outer wall portion 175.

The outer shape of the outer wall portion 175 is formed in, for example, a hexagonal shape along the peripheral edge of the ventilation portion 170. For example, the height of the outer wall portion 175 in the protrusion direction (protrusion height) is formed so as to tend to be lower from the rear to the front in the front-rear direction. For example, the protrusion height of the inner wall portion 176 is formed to be constant. The protrusion height of the outer wall portion 175 is formed to be relatively higher than the protrusion height of the inner wall portion 176.

The plurality of hexagonal regions 173 and the plurality of trapezoidal regions 174 are integrally arranged via the inner wall portion 176 without a gap therebetween. The outer shape of each of the plurality of hexagonal regions 173 is formed into, for example, a regular hexagon. The number of the plurality of hexagonal regions 173 is, for example, eight. The eight hexagonal regions 173 are arranged in a honeycomb structure. The eight hexagonal regions 173 include, for example, two central side hexagonal regions 177, three right side hexagonal regions 178, and three left side hexagonal regions 179.

The two central side hexagonal regions 177 are arranged adjacent to each other in the front-rear direction at a center 170a of the ventilation portion 170 such that two sides of the two central side hexagonal regions 177 adjoin each other. The center 170a is also the center of gravity of the outer wall portion 175 which is formed in a hexagonal shape.

The three right side hexagonal regions 178 are adjacent to the two central side hexagonal regions 177 from the right side in the left-right direction (positive side in the Y-axis direction), and are arranged sequentially adjacent to each other in the front-rear direction. The three left side hexagonal regions 179 are adjacent to the two central side hexagonal regions 177 from the left side in the left-right direction (negative side in the Y-axis direction), and are arranged sequentially adjacent to each other in the front-rear direction. The front-rear direction corresponds to a predetermined arrangement direction in the claims.

The three right side hexagonal regions 178 includes a first right side hexagonal region 178a adjacent to the two central side hexagonal regions 177, and two second right side hexagonal regions 178b sandwiching the first right side hexagonal region 178a from both sides in the front-rear direction and adjacent to any one of the two central side hexagonal regions 177. Each of the two second right side hexagonal regions 178b includes two trapezoidal regions 174 (hexagonal inner trapezoidal regions 181) that are arranged closer to (adjacent to) the outer wall portion 175 with respect to the center 170a of the ventilation portion 170 and partitioned by a predetermined inner wall portion 176a (176).

The inner wall portion 176a (176) that divides the second right side hexagonal region 178b is arranged in manner of connecting predetermined opposing vertices in the second right side hexagonal region 178b. The inner wall portion 176a (176) is parallel to a part 175a of the outer wall portion 175 that divides the second right side hexagonal region 178b, the part 175a intersects the arrangement direction (that is, the front-rear direction) of the three right side hexagonal regions 178 at an acute angle. The part 175a corresponds to a part of one side of the hexagon in the hexagonal outer wall portion 175.

That is, each of the two second right side hexagonal regions 178b includes therein (the interior surrounded by the inner wall portion 176 that partitions the second right side hexagonal region 178b) two trapezoidal regions 174 partitioned by the inner wall portion 176a arranged parallel to the part 175a of the outer wall portion 175. The first right side hexagonal region 178a corresponds to a different row hexagonal region in the claims. The second right side hexagonal region 178b corresponds to an outer wall side hexagonal region in the claims.

The three right side hexagonal regions 179 include a first left side hexagonal region 179a adjacent to the two central side hexagonal regions 177, and two second left side hexagonal regions 179b sandwiching the first left side hexagonal region 179a from both sides in the front-rear direction and adjacent to any one of the two central side hexagonal regions 177. Each of the two second left side hexagonal regions 179b includes two trapezoidal regions 174 (the hexagonal inner trapezoidal regions 181) that are arranged closer to (adjacent to) the outer wall portion 175 with respect to the center 170a of the ventilation portion 170 and partitioned by a predetermined inner wall portion 176b (176).

The inner wall portion 176b (176) that divides the second left side hexagonal region 179b is arranged in a manner of connecting predetermined opposing vertices in the second left side hexagonal region 179b. The inner wall portion 176b (176) is arranged parallel to a part 175b of the outer wall portion 175 that partitions the second left side hexagonal regions 179b, wherein the part 175b intersects the arrangement direction (that is, the front-rear direction) of the three left side hexagonal regions 179 at an acute angle. The part 175b corresponds to a part of one side of the hexagon in the hexagonal outer wall portion 175.

That is, each of the two second left side hexagonal regions 179b includes therein (in the interior surrounded by the inner wall portion 176 that partitions the second left side hexagonal region 179b) two trapezoidal regions 174 partitioned by the inner wall portion 176b arranged parallel to the part 175b of the outer wall portion 175. The first left side hexagonal region 179a corresponds to the different row hexagonal region in the claims. The second left side hexagonal region 179b corresponds to the outer wall side hexagonal region in the claims.

The outer shape of each of the plurality of trapezoidal regions 174 is formed into, for example, an isosceles trapezoid which is obtained by dividing the hexagonal region 173 into two equal parts. The number of the plurality of trapezoidal regions 174 is, for example, 14. The 14 trapezoidal regions 174 include, for example, eight hexagonal inner trapezoidal regions 181, two first outer wall side trapezoidal regions 182, and four second outer wall side trapezoidal regions 183.

The eight hexagonal inner trapezoidal regions 181 include four hexagonal inner trapezoidal regions 181 forming the two second right side hexagonal regions 178b, and four hexagonal inner trapezoidal regions 181 forming the two second left side hexagonal regions 179b.

The two first outer wall side trapezoidal regions 182 are adjacent to the two central side hexagonal regions 177 from both sides in the front-rear direction. Each first outer wall side trapezoidal region 182 is arranged in a manner that the upper base is in contact with one side of the central side hexagonal region 177. The two first outer wall side trapezoidal regions 182 include a first outer wall side trapezoidal region on the rear side 182*a* which is arranged on the rear side in the front-rear direction and a first outer wall side trapezoidal region on the front side 182*b* which is arranged on the front side.

The four second outer wall side trapezoidal regions 183 are adjacent to the three right side hexagonal regions 178 and the three left side hexagonal regions 179 from both sides in the left-right direction. The four second outer wall side trapezoidal regions 183 include two second outer wall side trapezoidal regions on the right side 183*a* arranged on the right side in the left-right direction and two second outer wall side trapezoidal regions on the left side 183*b* arranged on the left side. The two second outer wall side trapezoidal regions on the right side 183*a* are arranged in a manner that the upper base is in contact with the two right sides of the first right side hexagonal region 178*a*. The two second outer wall side trapezoidal regions on the left side 183*b* are arranged in a manner that the upper base is in contact with the two left sides of the first left side hexagonal region 179*a*.

The number of the plurality of ventilation holes 171 distributed in each of the two central side hexagonal regions 177, the first right side hexagonal region 178*a*, and the first left side hexagonal region 179*a* is, for example, 19. The 19 ventilation holes 171 constitute a first hole row 191, a second hole row 192, a third hole row 193, a fourth hole row 194 and a fifth hole row 195, which are sequentially arranged in a direction orthogonal to the opposite sides between arbitrary opposite sides in each of the hexagonal regions 177, 178*a*, 179*a*. Each of the first hole row 191 and the fifth hole row 195 includes three ventilation holes 171 arranged parallel to the opposite sides. Each of the second hole row 192 and the fourth hole row 194 includes four ventilation holes 171 arranged parallel to the opposite sides. The third hole row 193 includes five ventilation holes 171 arranged parallel to the opposite sides.

For example, when the gate of the resin material is arranged behind the ventilation portion 170 in the front-rear direction during the molding processing of the cover 120, the ventilation holes 171 are formed in the first outer wall side trapezoidal region on the rear side 182*a* of the two first outer wall side trapezoidal regions 182 that are arranged on both sides in the front-rear direction in the plurality of trapezoidal regions 174. On the other hand, the first outer wall side trapezoidal region on the front side 182*b* is a non-ventilation hole forming region (non-through hole forming region) 201 in which no ventilation holes 171 is formed. That is, the formation of the ventilation holes 171 is omitted on the downstream side in the flow direction of the resin material during the molding processing of the cover 120.

The number of the plurality of ventilation holes 171 distributed in each trapezoidal region 174 other than the first outer wall side trapezoidal region on the front side 182*b* is, for example, seven. The seven ventilation holes 171 constitute a sixth hole row 196 and a seventh hole row 197 arranged in a direction orthogonal to the base between the bases of each trapezoidal region 174. Moreover, the "base" as used herein refers to the upper base and the lower base, which are two parallel opposite sides of the four sides forming a trapezoid. The sixth hole row 196 includes three ventilation holes 171 arranged parallel to the base. The seventh hole row 197 includes four ventilation holes 171 arranged parallel to the base.

The second housing 122 includes a design portion 199 having a plurality of recesses 198 that have the same size as the ventilation holes 171 on the surface 122A of the vehicle interior 102 side. The outer shape of the design portion 199 is formed in, for example, a rectangular shape including the ventilation portion 170. The outer shape of the plurality of recesses 198 is formed in, for example, a columnar shape having the same diameter as the columnar ventilation holes 171. The plurality of recesses 198 are distributed in the design portion 199 in the same manner as the plurality of ventilation holes 171.

Each of the two lamp bodies 123 is, for example, a light emitting diode or the like.

The two external cameras 124 are, for example, stereo cameras or the like that are arranged apart from each other in the left-right direction. The two external cameras 124 detect pedestrians, objects, and the like in front of the vehicle 101 in the front-rear direction. The two external cameras 124 are controlled, for example, by the control device 125.

The control device 125 is a software function unit that functions by executing a predetermined program by a processor such as a central processing unit (CPU) or the like. The software function unit is an electronic control unit (ECU) equipped with a processor such as a CPU, a read only memory (ROM) for storing programs, a random access memory (RAM) for temporarily storing data, and an electronic circuit such as a timer or the like. At least a portion of the control device 125 may be an integrated circuit such as large sale integration (LSI) or the like.

The cooling fan 126 blows air taken in from the vehicle interior 102 through the plurality of ventilation holes 171 of the ventilation portion 170 toward the control device 125.

As described above, according to the cover 120 of the second embodiment, the ventilation portion 170 having the plurality of ventilation holes 171 is arranged facing the control device 125. With this configuration, the heat of the internal atmosphere covered by the second housing 122 is dissipated to the vehicle interior 102 through the plurality of ventilation holes 171 penetrating the second housing 122. Accordingly, the temperature rise in the internal atmosphere caused by heat generated by the control device 125 or the like covered by the second housing 122 can be suppressed.

Each of the plurality of hexagonal regions 173 and the plurality of trapezoidal regions 174 integrally arranged in the ventilation portion 170 is partitioned by the wall portion 172. Accordingly, the rigidity and strength of the ventilation portion 170 having the plurality of ventilation holes 171 can be improved.

The outer shape of the ventilation portion 170 is hexagonal, and the wall portion 172 includes the outer wall portion 175 arranged on the peripheral edge of the ventilation portion 170. With this configuration, the ventilation portion 170 is surrounded by the hexagonal outer wall portion 175. Accordingly, the rigidity and the strength of the ventilation portion 170 are improved as compared with a case in which the outer wall portion having, for example, a shape other than the hexagon is included, and the fluidity of the resin material around the outer wall portion 175 can be improved when the cover 120 is manufactured by, for example, molding processing.

The wall portion 172 includes the inner wall portion 176 surrounded by the outer wall portion 175, and the protrusion height of the outer wall portion 175 is formed to be relatively higher than the protrusion height of the inner wall portion 176. With this configuration, the air passing through the plurality of ventilation holes 171 of the ventilation portion 170 flows along the protrusion direction of the wall portion 172 while being guided by the outer wall portion 175. Accordingly, an air flow can be formed between the ventilation portion 170 and the control device 125. In addition, the cooling fan 126 blowing air to the control device 125 facilitates air intake from the vehicle interior 102 into the ventilation portion 170, thereby promoting heat radiation from the control device 125.

Among the plurality of hexagonal regions 173, each of the second right side hexagonal region 178b and the second left side hexagonal region 179b that are arranged closer to the outer wall portion 175 with respect to the center 170a of the ventilation portion 170 includes two trapezoidal regions 174 (the hexagonal inner trapezoidal regions 181) partitioned by the respective inner wall portions 176a (176) and 176b (176) parallel to the respective portions 175a and 175b of the outer wall portion 175. With this configuration, for example, when the cover 120 is manufactured by molding processing, the fluidity of the resin material around the hexagonal regions 178b and 179b and the outer wall portion 175 can be improved.

The ventilation holes 171 are arranged in the first outer wall side trapezoidal region on the rear side 182a on a gate mark G side with respect to the center 170a of the ventilation portion 170, and no ventilation hole 171 is arranged in the first outer wall side trapezoidal region on the front side 182b on the opposite sides of the gate mark G. That is, when the cover 120 is manufactured by molding processing, the first outer wall side trapezoidal region on the rear side 182a having the ventilation holes 171 is arranged on the upstream side of the resin material in the flow direction, and the first outer wall side trapezoidal region on the front side 182b having no ventilation hole 171 is arranged on the downstream side of the resin material in the flow direction.

That is, the first outer wall side trapezoidal region on the front side 182b is a non-ventilation hole forming region 201 in which no ventilation hole 171 is formed. Accordingly, for example, as compared with a case in which the first outer wall side trapezoidal region on the front side 182b having the ventilation holes 171 is arranged on the downstream side of the resin material in the flow direction, a decrease in the flow rate of the resin material in the first outer wall side trapezoidal region on the front side 182b on the downstream side can be suppressed, and the occurrence of short shots (molding defects) can be prevented.

Figure 21:
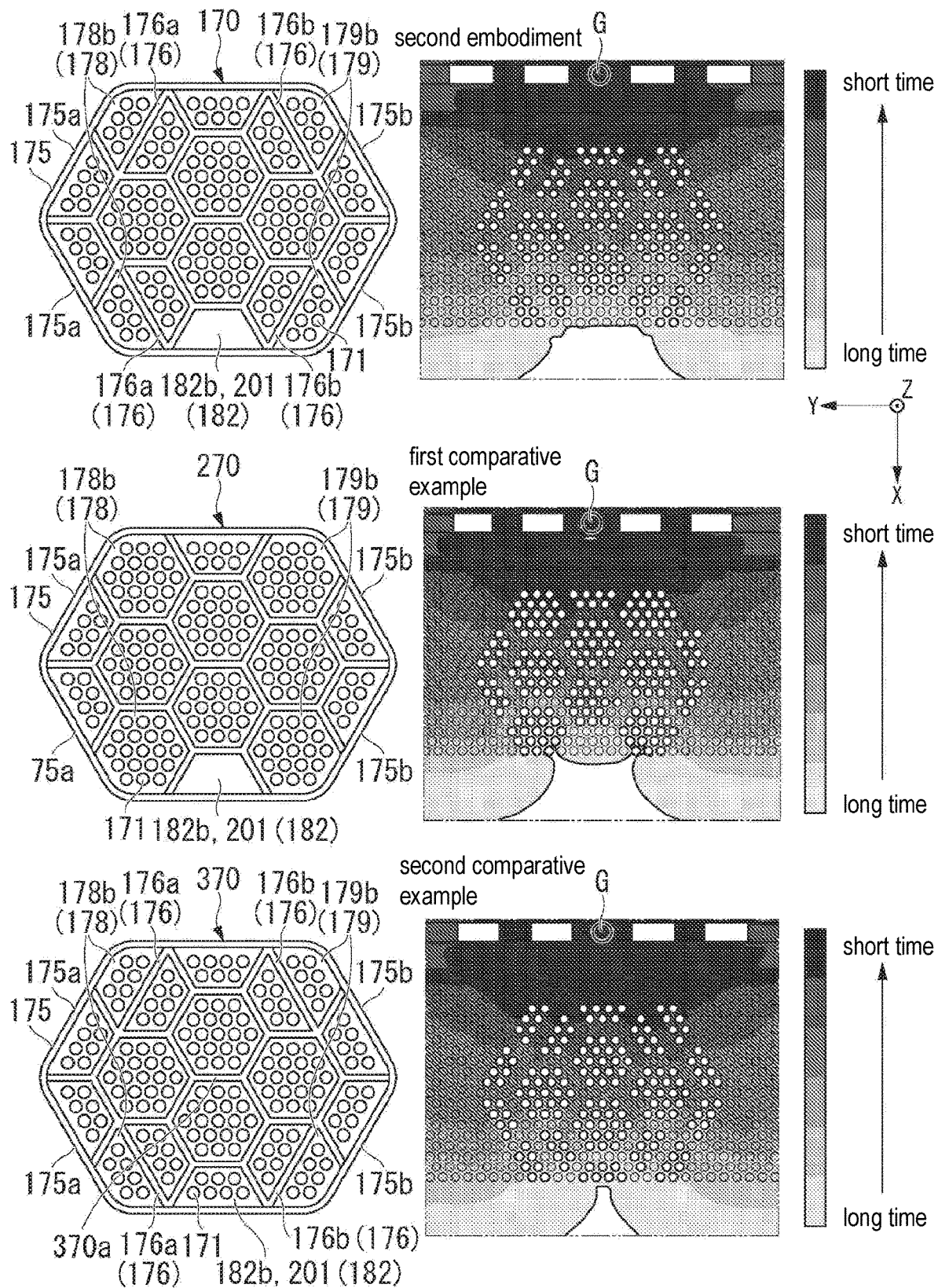
FIG. 21 are diagrams schematically showing flow of a resin material during molding processing of the cover in each of the second embodiment, a first comparative example, and a second comparative example of the present invention.

FIG. 21 are diagrams schematically showing flow of the resin material during the molding processing of the cover in each of the second embodiment, a first comparative example, and a second comparative example. In each of the second embodiment, the first comparative example, and the second comparative example, the gate mark G is formed behind the ventilation portions 170, 270, and 370 in the front-rear direction. In other words, the gate mark G is formed outside the ventilation portions 170, 270 and 370 (outside the region surrounded by the outer wall portion 175).

As shown in FIG. 21, in contrast to the ventilation portion 170 according to the second embodiment, in the ventilation portion 270 of the first comparative example, the inner wall portion 176a (176) that divides the second right side hexagonal region 178b and the inner wall portion 176b (176) that divides the second left side hexagonal region 179b are omitted. In the second embodiment, it is found that the flow rate of the resin material increases along the inner wall portions 176a (176) and 176b (176), and the resin material flows over the entire ventilation portion 170 at a uniform flow rate, as compared with the first comparative example.

Accordingly, in the second embodiment, the occurrence of short shots (molding defects) due to the decrease in the flow rate of the resin material in each of the hexagonal regions 178b and 179b is suppressed.

In contrast to the cover 120 according to the second embodiment, in the ventilation portion 370 of the second comparative example, a plurality of the ventilation holes are formed in the first outer wall side trapezoidal region on the front side 182b opposite to the gate mark G with respect to the center 370a of the ventilation portion 370. Accordingly, in the second comparative example, the flow of the resin material is hindered by pins or the like necessary for forming the ventilation holes 171. In the second embodiment, it is found that the flow rate of the resin material in the first outer wall side trapezoidal region on the front side 182b is increased, and the resin material flows over the entire ventilation portion 170 at a uniform flow rate, as compared with the second comparative example. Accordingly, in the second embodiment, the occurrence of short shots (molding defects) due to the decrease in the flow rate of the resin material in the first outer wall side trapezoidal region on the front side 182b is suppressed.

In the ventilation portion 170 of the second embodiment, 19 ventilation holes 171 are distributed in each of the hexagonal regions 177, 178a, 179a, and 7 ventilation holes 171 are distributed in each trapezoidal region 174. With this configuration, a predetermined number of ventilation holes 171 required for ensuring desired heat dissipation and suppressing the occurrence of short shots (molding defects) are arranged in the ventilation portion 170. Accordingly, a decrease in heat dissipation caused by, for example, a shortage of the number of the ventilation holes 171 or the occurrence of molding defects caused by, for example, an excessive number of the ventilation holes 171 can be prevented.

The second housing 122 of the second embodiment includes the design portion 199 having a plurality of the recesses 198 that have the same size as the ventilation holes 171 on the surface 122A of the vehicle interior 102 side. With this configuration, in contrast to the fact that the plurality of ventilation holes 171 are arranged for the purpose of ensuring heat dissipation and suppressing short shots (molding defects), a plurality of the recesses 198 are arranged on the surface 122A of the vehicle interior 102 side of the second housing 122 for the purpose of improving aesthetic appearance and appearance design. Accordingly, for example, the recesses 198 can be distributed uniformly in a predetermined region regardless of the arrangement of the plurality of hexagonal regions 173, the plurality of trapezoidal regions 174, and the wall portion 172 on the back surface 122B of the second housing 122 or the like. Therefore, the appearance design can be improved without deteriorating the aesthetic appearance of the second housing 122 when seen from the vehicle interior 102 side.

Hereinafter, a variation example of the second embodiment is described.

Variation Example

In the second embodiment described above, the cover 120 includes, but is not limited to, the first housing 121 and the second housing 122 that are formed separately, and may also include a housing that is integrally formed.

In the second embodiment described above, the first housing 121 is mechanically joined to the second housing 122, but the present invention is not limited thereto, and the first housing 121 and the second housing 122 may be joined by a method other than mechanical joining, such as welding or the like.

In the second embodiment described above, the ventilation portion 170 is arranged facing the control device 125, but the present invention is not limited thereto, and the ventilation portion 170 may be arranged facing a device serving as another heat source covered by the cover 120.

In the second embodiment described above, the vehicle lighting apparatus 110 includes, but is not limited to, two external cameras 124, and may additionally include other detection devices, or may include other detection devices instead of the two external cameras 124.

The other detection device is, for example, a radar that detects the distance and direction to a detection target using radio waves such as millimeter waves or the like, a laser range sensor that uses light to detect the distance to a detection target, or the like. The laser range sensor is, for example, LIDAR (Light Detection and Ranging or Laser Imaging Detection and Ranging).

The other detection device may also be, for example, a camera that detects an occupant or the like in the vehicle interior 102.

The embodiments of the present invention are by way of example only, and are not intended to limit the scope of the invention. These embodiments can be implemented in various other forms, and various omissions, replacements, and changes can be made without departing from the gist of the invention. These embodiments and variations thereof are included in the scope and gist of the invention and are also included in the scope of the invention described in the claims and the equivalents of the invention.

INDUSTRIAL APPLICABILITY

According to the vehicle lighting apparatus described above, the first housing and the second housing, which are formed separately from each other, can improve the diversification of specifications and the ease of manufacturing.

What is claimed is:

1. A vehicle lighting apparatus comprising:
   a first housing and a second housing that are formed separately from each other, joined in a state of being adjacent in a predetermined arrangement direction, and arranged on the upper portion of a vehicle interior of a vehicle;
   a first accommodating portion and a box portion arranged inside the first housing;
   a lamp body accommodated in the first accommodating portion;
   a lid portion that openably closes an opening portion which is arranged in the first housing so as to communicate with the inside of the box portion from the vehicle interior side; and
   a second accommodating portion which is arranged inside the second housing and in which a detection portion that detects at least one of the outside and the inside of the vehicle is accommodated,
   wherein the second housing comprises a wall portion that closes a second opening portion arranged in the box portion,
   at the edge of the second opening portion in the box portion, when both ends of the vehicle in a vertical direction are designated as an upper first end portion and a lower second end portion, and both ends of the wall portion of the second housing in the vertical direction are designated as an upper third end portion and a lower fourth end portion,
   the first end portion and the third end portion are joined to each other,
   the second end portion and the fourth end portion are joined to each other, and
   the first end portion and the third end portion are arranged relatively closer to the first housing side than the second end portion and the fourth end portion in the arrangement direction.

2. The vehicle lighting apparatus according to claim 1, wherein the first housing is made of polypropylene resin or acrylonitrile-butadiene-styrene resin, and
   the second housing is made of polycarbonate resin.

3. The vehicle lighting apparatus according to claim 1, wherein the second end portion and the fourth end portion are joined by a combination of a plurality of claw portions and a plurality of claw fixing portions to which the plurality of claw portions are fixed,
   the plurality of claw fixing portions comprise:
   a first claw fixing portion to which the claw portion is abutted in the vertical direction; and
   a second claw fixing portion to which the claw portion is abutted in a crossing direction crossing each of the vertical direction and the arrangement direction.

4. The vehicle lighting apparatus according to claim 3, wherein the first claw fixing portion is arranged on the central side in the crossing direction at either the second end portion or the fourth end portion, and
   the second claw fixing portion is arranged relatively closer to the end portion side than the first claw fixing portion in the crossing direction at either the second end portion or the fourth end portion.

5. The vehicle lighting apparatus according to claim 3, wherein the second end portion comprises the plurality of claw portions extending from the lower side toward the upper side in the vertical direction, and
   the fourth end portion comprises the plurality of claw fixing portions arranged in a plurality of insertion holes into which the plurality of claw portions are inserted from the lower side toward the upper side in the vertical direction.

6. The vehicle lighting apparatus according to claim 3, comprising:
   a first screw mounting portion arranged in the first housing;
   a second screw mounting portion arranged in the second housing so as to communicate with the first screw mounting portion; and
   a screw member that fixes the first housing and the second housing by being mounted on the first screw mounting portion and the second screw mounting portion.

7. The vehicle lighting apparatus according to claim 1, wherein the second housing comprises:
   a cover body that covers a surface of a control device that controls a detection device arranged in the vehicle interior of the vehicle to detect an object outside the vehicle, wherein the surface faces the inside of the vehicle interior; and
   a ventilation portion which is arranged facing the control device in a predetermined direction in the cover body and which has a plurality of through holes penetrating the cover body,
   the ventilation portion comprises:
   a wall portion protruding toward the control device; and a plurality of hexagonal regions and a plurality of trapezoidal regions partitioned by the wall portion and arranged adjacent to each other via the wall portion.

8. The vehicle lighting apparatus according to claim 7, wherein the wall portion comprises: an inner wall portion that is arranged between each of the plurality of hexagonal regions, between each of the plurality of trapezoidal regions, and between the plurality of hexagonal regions and the plurality of trapezoidal regions; and
an outer wall portion having a hexagonal outer shape, which is arranged integrally with the inner wall portion and is arranged on the periphery of the ventilation portion.

9. The vehicle lighting apparatus according to claim 7, comprising, on the surface of the cover body on the vehicle interior side, a design portion in which a plurality of recesses having the same diameter as the through holes are formed.

10. The vehicle lighting apparatus according to claim 8, wherein the protrusion height of the outer wall portion is higher than the protrusion height of the inner wall portion.

11. The vehicle lighting apparatus according to claim 10, wherein among the plurality of hexagonal regions, the hexagonal region arranged adjacent to the outer wall portion is defined as an outer wall side hexagonal region, and two trapezoidal regions, which are partitioned by the inner wall portion arranged parallel to one of the outer wall portions adjacent to the outer wall side hexagonal region, are arranged inside the outer wall side hexagonal region.

12. The vehicle lighting apparatus according to claim 11, wherein the number of the plurality of hexagonal regions is eight, and the plurality of hexagonal regions arranged in a honeycomb structure comprise: two central side hexagonal regions adjacent to a predetermined arrangement direction at the center of the ventilation portion; two different row hexagonal regions adjacent to each of the two central side hexagonal regions from both sides in a direction orthogonal to the predetermined arrangement direction; and four outer wall side hexagonal regions adjacent to any one of the two central side hexagonal regions and any one of the two different row hexagonal regions,
the number of the plurality of trapezoidal regions is 14, and the 14 trapezoidal regions comprise: two first outer wall side trapezoidal regions adjacent to each of the two central side hexagonal regions from both sides in the predetermined arrangement direction; eight hexagonal inner trapezoidal regions arranged two by two in each of the four outer wall side hexagonal regions; and four second outer wall side trapezoidal regions adjacent to each of the two different row hexagonal regions from both sides in a direction orthogonal to the predetermined arrangement direction.

13. The vehicle lighting apparatus according to claim 12, wherein the cover body comprises a gate mark arranged outside the ventilation portion, and
one of the two first outer wall side trapezoidal regions that has a longer distance from the gate mark than the other is a non-through holes forming region in which the through holes are not formed.

14. The vehicle lighting apparatus according to claim 12, wherein 19 through holes are formed in each of the two central side hexagonal regions and the two different row hexagonal regions,
each of the two central side hexagonal regions and the two different row hexagonal regions has a first hole row, a second hole row, a third hole row, a fourth hole row, and a fifth hole row arranged sequentially between arbitrary opposite sides of the hexagonal region in a direction orthogonal to the opposite sides,
in each of the first hole row and the fifth hole row, three through holes are arranged parallel to the opposite sides,
in each of the second hole row and the fourth hole row, four through holes are arranged parallel to the opposite sides,
in the third hole row, five through holes are arranged parallel to the opposite sides,
seven through holes are formed in one of the two first outer wall side trapezoidal regions, and in each of the four second outer wall side trapezoidal regions and the eight hexagonal inner trapezoidal regions,
a sixth hole row and a seventh hole row that are arranged side by side between the bases of the trapezoidal region in a direction orthogonal to the base are arranged in one of the two first outer wall side trapezoidal regions, and in each of the four second outer wall side trapezoidal regions and the eight hexagonal inner trapezoidal regions,
in the sixth hole row, three through holes are arranged parallel to the base, and
in the seventh hole row, four through holes are arranged parallel to the base.

15. A vehicle lighting apparatus comprising:
a first housing and a second housing that are formed separately from each other, joined in a state of being adjacent in a predetermined arrangement direction, and arranged on the upper portion of a vehicle interior of a vehicle;
a first accommodating portion and a box portion arranged inside the first housing;
a lamp body accommodated in the first accommodating portion;
a lid portion that openably closes an opening portion which is arranged in the first housing so as to communicate with the inside of the box portion from the vehicle interior side; and
a wall portion arranged in the second housing so as to block a second opening portion arranged in the box portion,
wherein at the edge of the second opening portion in the box portion, when both ends of the vehicle in a vertical direction are designated as an upper first end portion and a lower second end portion, and both ends of the wall portion of the second housing in the vertical direction are designated as an upper third end portion and a lower fourth end portion,
the first end portion and the third end portion are joined to each other,
the second end portion and the fourth end portion are joined to each other, and
the second end portion is arranged relatively closer to the lower side than the fourth end portion in the vertical direction.

16. The vehicle lighting apparatus according to claim 15, wherein the first housing is made of polypropylene resin or acrylonitrile-butadiene-styrene resin, and
the second housing is made of a synthetic resin of polycarbonate resin and acrylonitrile-butadiene-styrene resin or acrylonitrile-butadiene-styrene resin.

\* \* \* \* \*